(12) United States Patent
Urushihara et al.

(10) Patent No.: US 6,386,177 B2
(45) Date of Patent: May 14, 2002

(54) SYSTEM AND METHOD FOR AUTO-IGNITION OF GASOLINE INTERNAL COMBUSTION ENGINE

(75) Inventors: Tomonori Urushihara; Koji Hiraya, both of Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/767,025

(22) Filed: Jan. 23, 2001

(30) Foreign Application Priority Data

Jan. 25, 2000 (JP) .................................. 2000-015718

(51) Int. Cl.$^7$ ............................. F02B 3/00; F02M 25/07
(52) U.S. Cl. ............................ 123/299; 123/568.14
(58) Field of Search ........................ 123/295, 299, 123/568.14, 90.15

(56) References Cited

U.S. PATENT DOCUMENTS

| | | | | |
|---|---|---|---|---|
| 5,535,716 A | | 7/1996 | Sato et al. | 123/279 |
| 5,785,016 A | | 7/1998 | Enderle et al. | 123/90.11 |
| 5,918,577 A | * | 7/1999 | Martelli et al. | 123/295 |
| 6,202,624 B1 | * | 3/2001 | Stuerz et al. | 123/295 |
| 6,321,715 B1 | * | 11/2001 | Dong | 123/568.14 |
| 2001/0050070 A1 | * | 12/2001 | Xu et al. | 123/568.14 |

FOREIGN PATENT DOCUMENTS

| | | |
|---|---|---|
| JP | 7-332141 | 12/1995 |
| JP | 9-203307 | 8/1997 |
| JP | 11-72038 | 3/1999 |

* cited by examiner

*Primary Examiner*—Erick Solis
(74) *Attorney, Agent, or Firm*—Foley & Lardner

(57) ABSTRACT

During operation with part load, a gasoline internal combustion engine is operated with a lean air/fuel mixture by auto-ignition. During operation with full load, spark-ignition is used to operate the engine. The internal combustion engine is operated in three auto-ignition combustion modes depending upon magnitude of a predetermined operating parameter. The operating parameter is indicative of the engine load or the engine speed. The three auto-ignition combustion modes are a gasoline reform auto-ignition combustion mode, an auto-ignition stratified charge combustion mode, and an auto-ignition homogeneous charge combustion mode. In the gasoline reform auto-ignition combustion mode that may be selected during operation with low part load, a first fuel injection during an exhaust gas retaining phase produces sufficient amount of active fuel radicals for promotion of auto-ignition of air/fuel mixture produced by a second fuel injection during the subsequent compression phase. In the auto-ignition stratified charge combustion mode that may be selected during operation with intermediate part load, a fuel injection during compression phase supports auto-ignition. In the auto-ignition homogeneous charge combustion mode that may be selected during operation with high part load, a fuel injection during intake phase supports auto-ignition.

22 Claims, 17 Drawing Sheets

FIG.4A EXHAUST
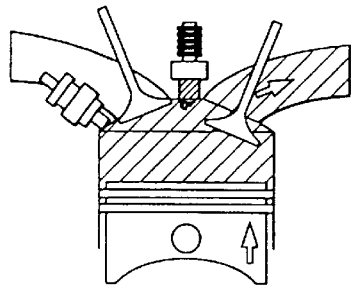
FIG.4E INTAKE
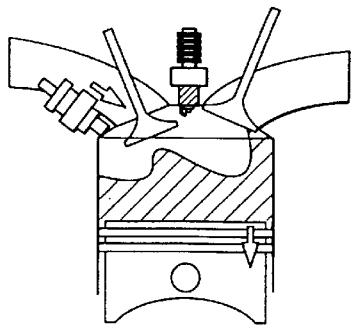
FIG.4B RETAINING OF EX. GAS
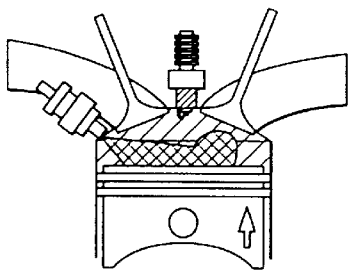
FIG.4F COMPRESSION
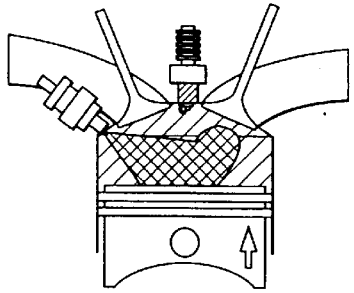
FIG.4C TDC OF EX. GAS COMPRESSION
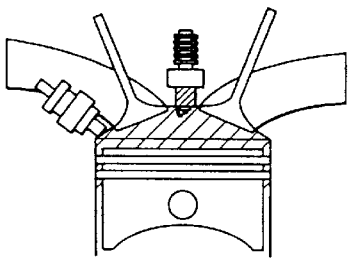
FIG.4G TDC OF COMPRESSION (AUTO-IGNITION)
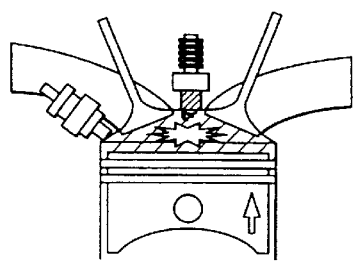
FIG.4D RETAINING OF EX. GAS
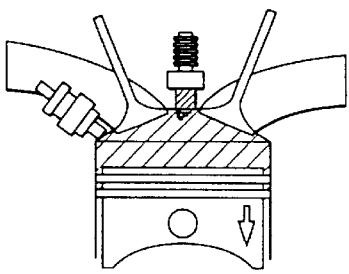

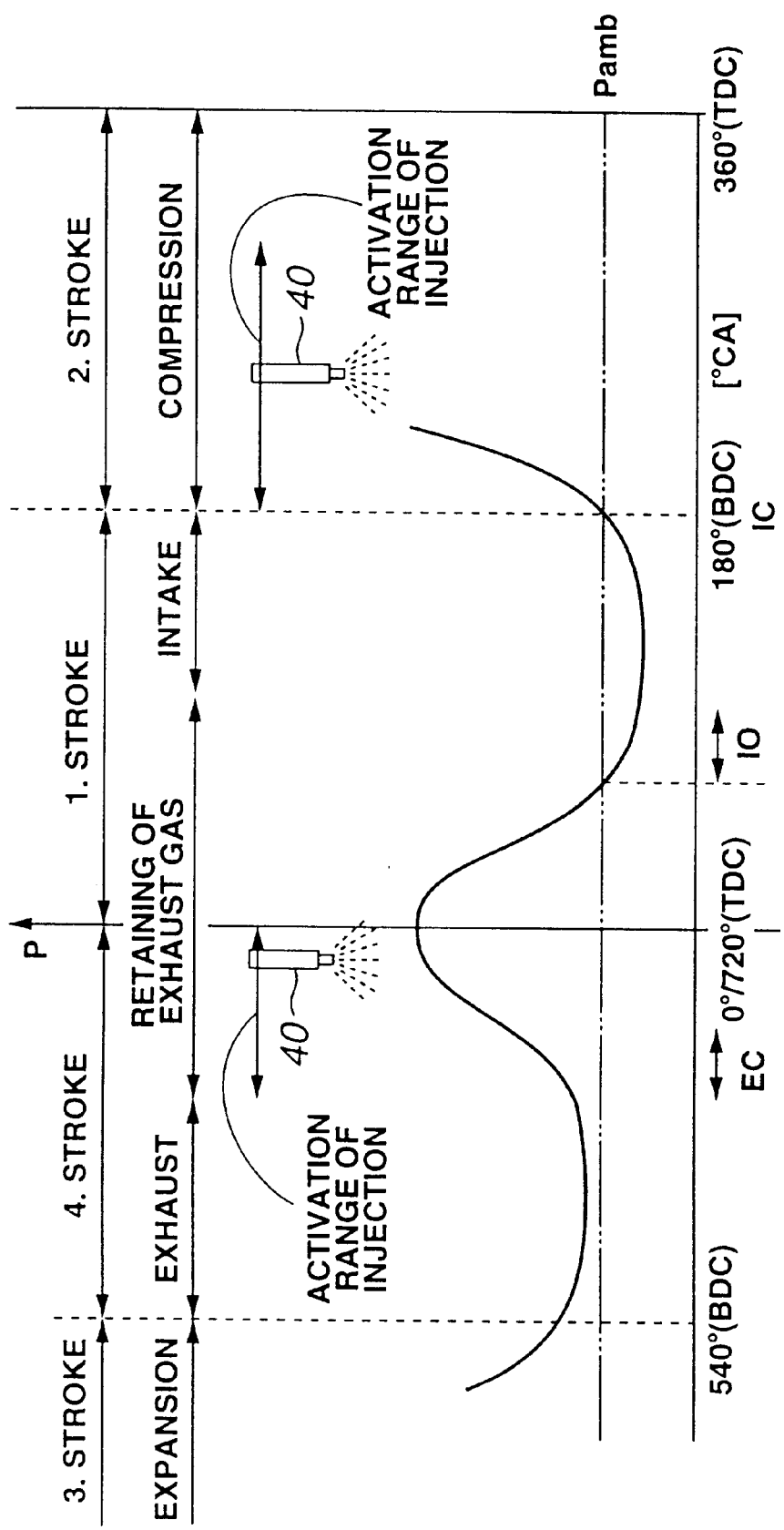

EXHAUST STROKE

COMPRESSION STROKE

INTAKE STROKE

COMPRESSION TDC

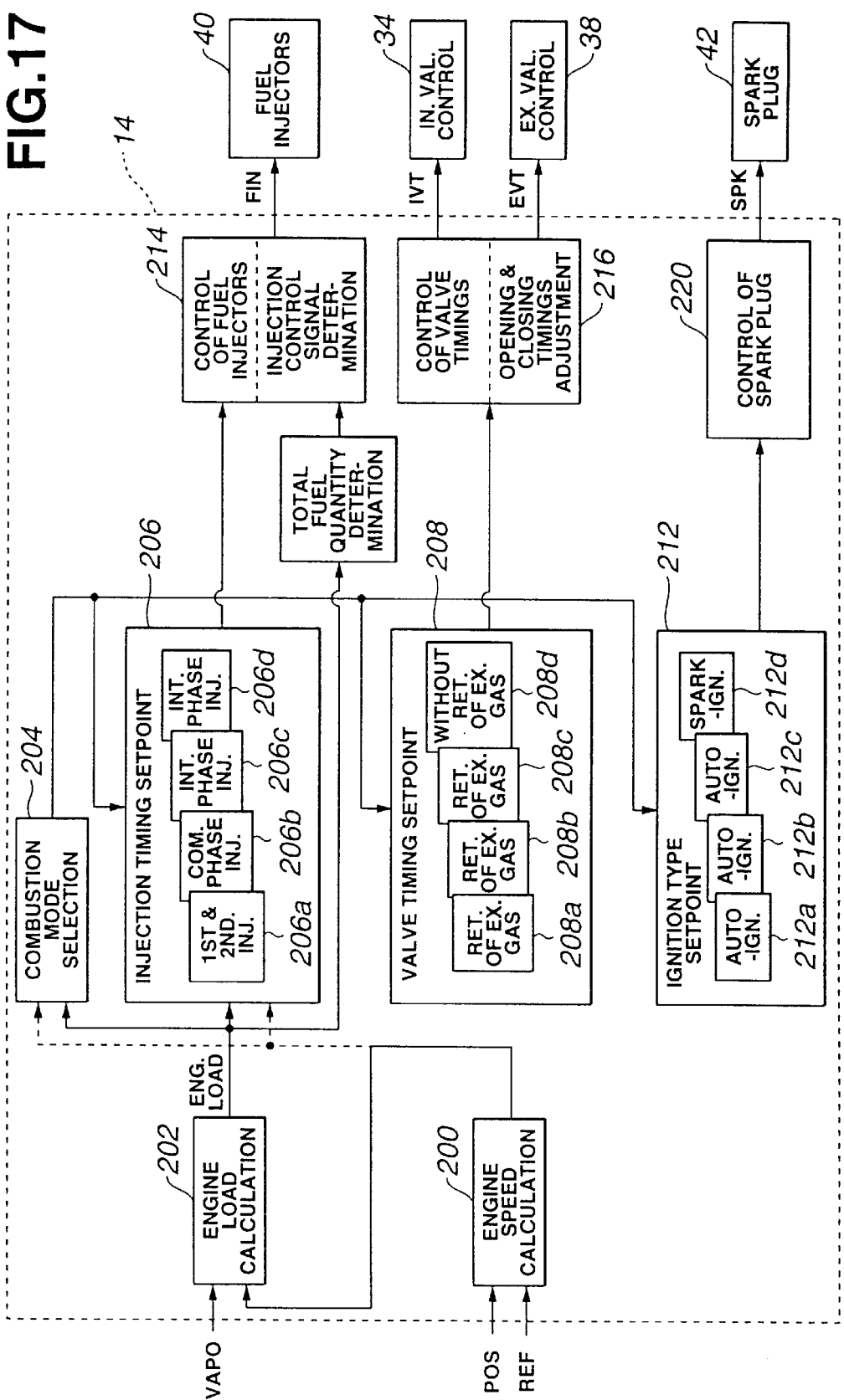

SYSTEM AND METHOD FOR AUTO-IGNITION OF GASOLINE INTERNAL COMBUSTION ENGINE

BACKGROUND OF THE INVENTION

1. Field of the Invention

The present invention relates to a system and a method for an auto-ignition of gasoline internal combustion engine that runs under lean burn and controlled auto-ignition combustion conditions during operation with part load.

2. Description of Related Art

To improve thermal efficiency of gasoline internal combustion engines, lean burn is known to give enhanced thermal efficiency by reducing pumping losses and increasing ratio of specific heats. Flatly speaking, lean burn is known to give low fuel consumption and low NOx emissions. There is however a limit at which an engine can be operated with a lean air/fuel mixture because of misfire and combustion instability as a result of a slow burn. Known methods to extend the lean limit include improving ignitability of the mixture by enhancing the fuel preparation, for example using atomized fuel or vaporized fuel, and increasing the flame speed by introducing charge motion and turbulence in the air/fuel mixture. Finally, combustion by auto-ignition has been proposed for operating an engine with very lean air/fuel mixtures.

When certain conditions are met within a homogeneous charge of lean air/fuel mixture during low load operation, auto-ignition can occur wherein bulk combustion takes place initiated simultaneously from many ignition sites within the charge, resulting in very stable power output, very clean combustion and high thermal efficiency. NOx emission produced in controlled auto-ignition combustion is extremely low in comparison with spark ignition combustion based on propagating flame front and heterogeneous charge compression ignition combustion based on an attached diffusion flame. In the latter two cases represented by spark ignition engine and diesel engine, respectively, the burnt gas temperature is highly heterogeneous within the charge with very high local temperature values creating high NOx emission. By contrast, in controlled auto-ignition combustion where the combustion is uniformly distributed throughout the charge from many ignition sites, the burnt gas temperature is substantially homogeneous with much lower local temperature values resulting in very low NOx emission.

Engines operating under controlled auto-ignition combustion have already been successfully demonstrated in two-stroke gasoline engines using a conventional compression ratio. It is believed that the high proportion of burnt gases remaining from the previous cycle, i.e., the residual content, within the two-stroke engine combustion chamber is responsible for providing the hot charge temperature and active fuel radicals necessary to promote auto-ignition in a very lean air/fuel mixture. In four-stroke engines, because the residual content is low, auto-ignition is more difficult to achieve, but can be induced by heating the intake air to a high temperature or by significantly increasing the compression ratio.

In all the above cases, the range of engine speeds and loads in which controlled auto-ignition combustion can be achieved is relatively narrow. The fuel used also has a significant effect on the operating range, for example, diesel fuel and methanol fuel have wider auto-ignition ranges than gasoline fuel.

An auto-ignition, which is induced by heating fuel and significantly increasing the compression ratio, in four-stroke gasoline engine is described in U.S. Pat. No. 5,535,716, which claims priority of Japanese patent application No. 6-150487 that was laid open as JP-A 7-332141 on Dec. 22, 1995. Gasoline fuel is injected inside the intake port a considerable amount of time before the intake valve is open so that the mixture of air and gasoline in the intake port is sufficiently heated before entering the combustion chamber. The mixture is ignited by compression ignition performed at high pressure. Since the gasoline fuel injected in the intake port is completely evaporated before entering the combustion chamber, reliable compression ignition is achieved. The compression ratio ranges from about 14 to about 20. Use of a compression ratio of 17.7 is described as the most preferred implementation in this publication. Injection of the gasoline fuel is performed during a predetermined period from 10 degrees of crankshaft angle before the intake valve is closed to 110 degrees of crankshaft angle before the intake valve is opened.

JP-A 11-72038 describes a technique to avoid knocking in a compression ignition diesel engine. According to this known technique, an amount of diesel fuel less as much as 30 percent of the maximum amount of fuel is injected during a period from about 90 degrees of crankshaft angle before top dead center (TDC) of compression stroke to about 20 degrees of crankshaft angle before the TDC. This first injection of diesel accomplishes sufficient oxidation of fuel by the time the piston ascends to TDC of the compression stroke. At around the TDC, a second injection of diesel is performed to initiate burning of the injected diesel. This knocking avoidance technique cannot be applied to compression ignition of gasoline fuel that has a low cetane number.

The present invention seeks to provide a system and a method for operating an internal combustion engine such that lean burn of gasoline fuel due to controlled auto-ignition takes over the engine operation over an extended range of an engine operation parameter indicative of the engine speed or the engine load.

An object of the present invention is to provide a system and a method for an auto-ignition of gasoline internal combustion engine such that parameters controlling the cylinder content including gasoline fuel are adjusted to cause an auto-ignition over an extended range of an engine operation parameter.

Another object of the present invention is to provide a computer readable storage device or medium for a system and a method for an auto-ignition of gasoline internal combustion engine such that parameters controlling the cylinder content including gasoline fuel are adjusted to cause an auto-ignition over an extended range of an engine operation parameter.

SUMMARY OF THE INVENTION

In carrying out the present invention, a system for an auto-ignition of gasoline internal combustion engine is provided. The system comprises:

a cylinder;

a piston disposed within said cylinder for reciprocating motion to define a combustion chamber;

intake means for admitting fresh air into said cylinder;

a fuel injector directly communicating with said combustion chamber;

exhaust means for discharging exhaust gas resulting from combustion within said cylinder; and a control unit adjusting opening and closing timings of said intake means and opening and closing timings of said exhaust means such that said piston reciprocates within said cylinder to perform an exhaust phase, an exhaust gas retaining phase, an intake phase, a compression phase, and an expansion phase, wherein said intake means and exhaust means being closed to retain exhaust gas within said cylinder during said exhaust gas retaining phase, said control unit providing a first start time of a first fuel injection by said fuel injector during said exhaust gas retaining phase and a second start time of a second fuel injection by said fuel injector during said compression phase, said control unit determining a portion of total fuel quantity and the remainder of said total fuel quantity, said control unit determining a first fuel injection control signal indicative of said portion of said total fuel quantity and applying said first fuel injection control signal to said fuel injector at said first start time to control fuel quantity injected for said first fuel injection, said control unit determining a second fuel injection control signal indicative of the remainder of said total fuel quantity and applying said second fuel injection control signal at said second start time to control fuel quantity injected for said second fuel injection, said remainder of said total fuel quantity being proportional to the engine load of the internal combustion engine.

In carrying out the present invention, one embodiment provides a system for an auto-ignition of gasoline internal combustion engine comprising:

a cylinder;

a piston disposed within said cylinder for reciprocating motion to define a combustion chamber;

intake means for admitting fresh air into said cylinder;

a fuel injector directly communicating with said combustion chamber;

exhaust means for discharging exhaust gas resulting from combustion within said cylinder; and a control unit selecting one of a gasoline reform auto-ignition combustion mode and an auto-ignition combustion mode in response to magnitude of an operating parameter indicative of one of the engine load and the engine speed of the internal combustion engine, said control unit being operative during selection of said gasoline reform auto-ignition combustion mode to adjust opening and closing timings of said intake means and opening and closing timings of said exhaust means such that said piston reciprocates within said cylinder to perform an exhaust phase, an exhaust gas retaining phase, an intake phase, a compression phase, and an expansion phase, said control unit being operative during selection of said gasoline reform auto-ignition combustion mode to provide a first start time of a first fuel injection by said fuel injector during said exhaust gas retaining phase and a second start time of a second fuel injection by said fuel injector during said compression phase, said control unit determining total fuel quantity to be injected in response to engine load of the internal combustion engine, said control unit being operative during selection of said gasoline reform auto-ignition combustion mode to determine a portion of and the remainder of said determined total fuel quantity, said control unit being operative during selection of said gasoline reform auto-ignition combustion mode to determine a first fuel injection control signal indicative of said portion of said determined total fuel quantity and applying said first fuel injection control signal to said fuel injector at said first start time to control fuel quantity injected for said first fuel injection, said control unit being operative during selection of said gasoline reform auto-ignition combustion mode to determine a second fuel injection control signal indicative of the remainder of said determined total fuel quantity and applying said second fuel injection control signal at said second start time to control fuel quantity injected for said second fuel injection.

In carrying out the present invention, a computer readable storage device is provided. The computer readable storage device has stored therein data representing instructions executable by a computer to implement an auto-ignition of gasoline internal combustion engine. The engine has a piston disposed in a cylinder for reciprocating motion to define a combustion chamber, intake means for admitting fresh air into the cylinder, a fuel injector directly communicating with the combustion chamber, and exhaust means for discharging exhaust gas resulting from combustion within the cylinder, wherein opening and closing timings of the intake means and opening and closing timings of the exhaust means are adjustable. The computer readable storage device comprises:

instructions for adjusting opening and closing timings of the intake means and opening and closing timings of the exhaust means such that the piston reciprocates within the cylinder to perform an exhaust phase, an exhaust gas retaining phase, an intake phase, a compression phase, and an expansion phase;

instructions for providing a first start time of a first fuel injection by the fuel injector during said exhaust gas retaining phase and a second start time of a second fuel injection by the fuel injector during said compression phase;

instructions for determining a portion of total fuel quantity and the remainder of said total fuel quantity;

instructions for determining a first fuel injection control signal indicative of said portion of said total fuel quantity and applying said first fuel injection control signal to the fuel injector at said first start time to control fuel quantity injected for said first fuel injection; and instructions for determining a second fuel injection control signal indicative of the remainder of said total fuel quantity and applying said second fuel injection control signal to the fuel injector at said second start time to control fuel quantity injected for said second fuel injection.

In carrying out the present invention, there is further provided a computer readable storage device having stored therein data representing instructions executable by a computer to implement an auto-ignition of gasoline internal combustion engine, the engine having a piston disposed in a cylinder for reciprocating motion to define a combustion chamber, intake means for admitting fresh air into the cylinder, a fuel injector directly communicating with the combustion chamber, and exhaust means for discharging exhaust gas resulting from combustion within the cylinder, wherein opening and closing timings of the intake means and opening and closing timings of the exhaust means are adjustable, the computer readable storage device comprising:

instructions for selecting one of a gasoline reform auto-ignition combustion mode and an auto-ignition combustion mode in response to magnitude of an operating parameter indicative of one of the engine load and the engine speed of the internal combustion engine;

instructions for adjusting, during selection of said gasoline reform auto-ignition combustion mode, opening and closing timings of the intake means and opening and closing timings of the exhaust means such that the piston reciprocates within the cylinder to perform an exhaust phase, an exhaust gas retaining phase, an intake phase, a compression phase, and an expansion phase;

instructions for providing, during selection of said gasoline reform auto-ignition combustion mode, a first start time of a first fuel injection by the fuel injector during said exhaust gas retaining phase and a second start time of a second fuel injection by the fuel injector during said compression phase;

instructions for determining total fuel quantity to be injected in response to engine load of the internal combustion engine;

instructions for determining, during selection of said gasoline reform auto-ignition combustion mode, a portion of and the remainder of said determined total fuel quantity;

instructions for determining, during selection of said gasoline reform auto-ignition combustion mode, a first fuel injection control signal indicative of said portion of said determined total fuel quantity and applying said first fuel injection control signal to the fuel injector at said first start time to control fuel quantity injected for said first fuel injection; and instructions for determining, during selection of said gasoline reform auto-ignition combustion mode, a second fuel injection control signal indicative of the remainder of said determined total fuel quantity and applying said second fuel injection control signal to the fuel injector at said second start time to control fuel quantity injected for said second fuel injection.

In carrying out the present invention, there is provided a method for an auto-ignition of gasoline internal combustion engine, the engine having a piston disposed in a cylinder for reciprocating motion to define a combustion chamber, intake means for admitting fresh air into the cylinder, a fuel injector directly communicating with the combustion chamber, and exhaust means for discharging exhaust gas resulting from combustion within the cylinder, wherein opening and closing timings of the intake means and opening and closing timings of the exhaust means are adjustable, the method comprising:

adjusting opening and closing timings of the intake means and opening and closing timings of the exhaust means such that the piston reciprocates within the cylinder to perform an exhaust phase, an exhaust gas retaining phase, an intake phase, a compression phase, and an expansion phase;

providing a first start time of a first fuel injection by the fuel injector during said exhaust gas retaining phase and a second start time of a second fuel injection by the fuel injector during said compression phase;

determining a portion of total fuel quantity and the remainder of said total fuel quantity;

determining a first fuel injection control signal indicative of said portion of said total fuel quantity;

determining a second fuel injection control signal indicative of the remainder of said total fuel quantity;

applying said first fuel injection control signal to the fuel injector at said first start time to control fuel quantity injected for said first fuel injection; and applying said second fuel injection control signal at said second start time to control fuel quantity injected for said second fuel injection.

In carrying out the present invention, there is provided a method for an auto-ignition of gasoline internal combustion engine, the engine having a piston disposed in a cylinder for reciprocating motion to define a combustion chamber, intake means for admitting fresh air into the cylinder, a fuel injector directly communicating with the combustion chamber, and exhaust means for discharging exhaust gas resulting from combustion within the cylinder, wherein opening and closing timings of the intake means and opening and closing timings of the exhaust means are adjustable, the method comprising:

selecting one of a gasoline reform auto-ignition combustion mode and an auto-ignition combustion mode in response to magnitude of an operating parameter indicative of one of the engine load and the engine speed of the internal combustion engine;

adjusting, during selection of said gasoline reform auto-ignition combustion mode, opening and closing timings of the intake means and opening and closing timings of the exhaust means such that the piston reciprocates within the cylinder to perform an exhaust phase, an exhaust gas retaining phase, an intake phase, a compression phase, and an expansion phase;

providing, during selection of said gasoline reform auto-ignition combustion mode, a first start time of a first fuel injection by the fuel injector during said exhaust gas retaining phase and a second start time of a second fuel injection by the fuel injector during said compression phase;

determining total fuel quantity to be injected in response to the engine load of the internal combustion engine;

determining, during selection of said gasoline reform auto-ignition combustion mode, a portion of and the remainder of said determined total fuel quantity;

determining, during selection of said gasoline reform auto-ignition combustion mode, a first fuel injection control signal indicative of said portion of said determined total fuel quantity;

determining, during selection of said gasoline reform auto-ignition combustion mode, a second fuel injection control signal indicative of the remainder of said determined total fuel quantity;

applying said first fuel injection control signal to the fuel injector at said first start time to control fuel quantity injected for said first fuel injection; and applying said second fuel injection control signal to the fuel injector at said second start time to control fuel quantity injected for said second fuel injection.

BRIEF DESCRIPTION OF THE DRAWINGS

FIG. 4A shows a schematic diagram of an engine cylinder and intake and exhaust valves to perform an exhaust phase.

FIGS. 4B, 4C and 4D show a schematic diagram of cylinder and valves to perform an exhaust gas retaining phase.

FIG. 4E shows a schematic diagram of cylinder and valves to perform an intake phase.

FIG. 4F shows a schematic diagram of cylinder and valves to perform a compression phase.

FIG. 4G shows a schematic diagram of cylinder and valves to achieve an auto-ignition when a piston reaches top dead center (TDC) of compression phase.

FIG. 5 illustrates graphically the conditions of engine operation during selection of a gasoline reform auto-ignition combustion mode.

FIG. 17 is a block diagram of the controller architecture for obtaining three different auto-ignition combustion modes and a spark-ignition combustion mode.

BEST MODES FOR CARRYING OUT THE INVENTION

Figure 1:
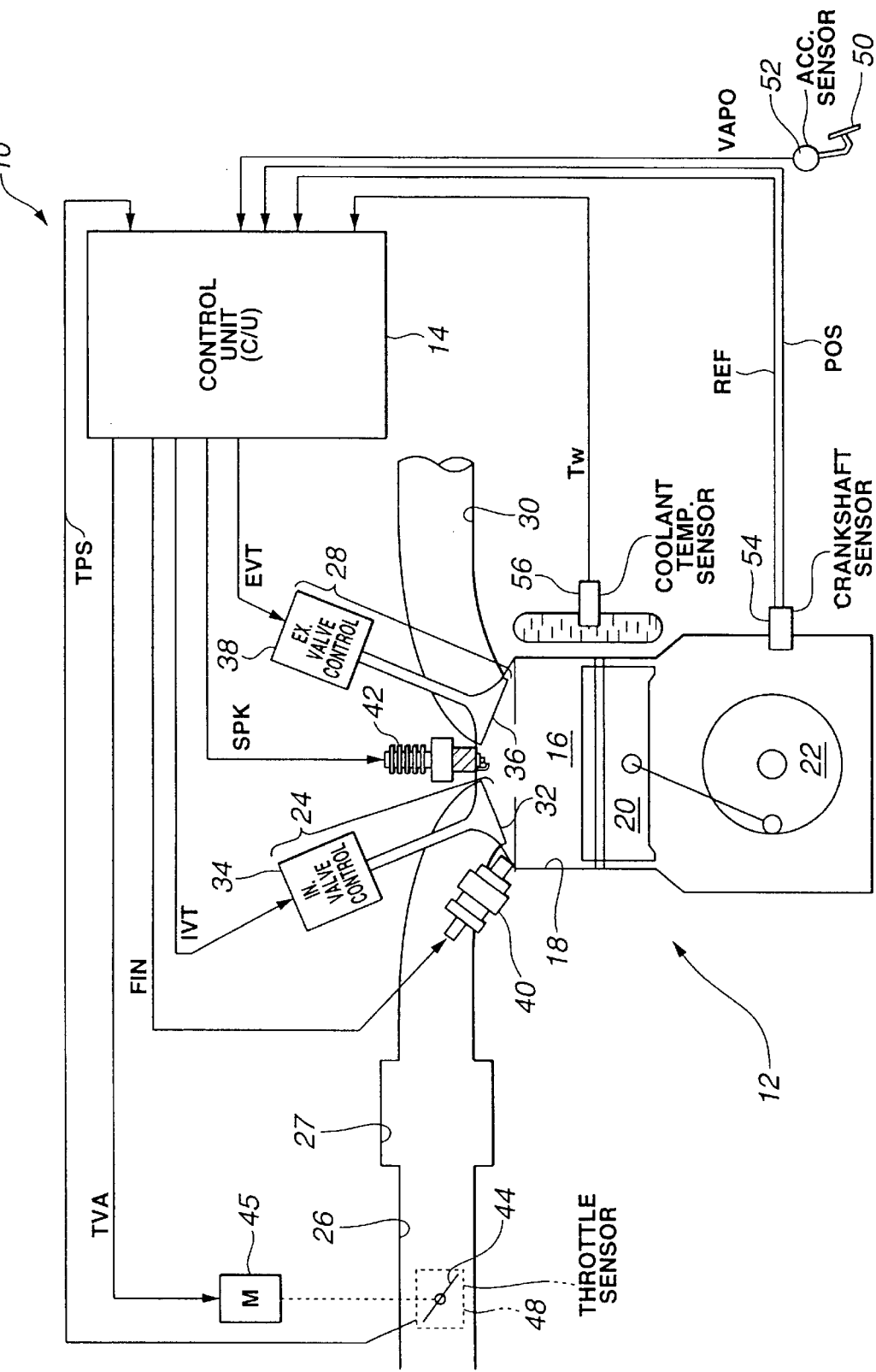
FIG. 1 is a block diagram illustrating a system and a method for operation of an internal combustion engine according to the present invention.

FIG. 1 is a block diagram illustrating operation of a system or method for controlling the fuel injection timing, the engine valve timing, and the ignition of a gasoline internal combustion engine during selection of one of a gasoline reform auto-ignition combustion mode, an auto-ignition stratified charge combustion mode, an auto-ignition homogeneous charge combustion mode, and a spark-ignition homogeneous charge combustion mode. System 10 includes an internal combustion engine, indicated generally by reference numeral 12, in communication with a control unit (C/U) 14. As schematically shown in FIG. 1, engine 12 has at least one combustion chamber 16 defined within a cylinder 18 by a reciprocating piston 20 operatively connected to a crankshaft 22. Combustion chamber 16 is provided with intake means 24 together with an intake manifold 26, including a collector 27, and exhaust means 28 together with an exhaust manifold 30. For admitting fresh air into combustion chamber 16, intake means 24 include at least one intake valve 32, each driven by a variable valve control 34. For discharging exhaust gas resulting from combustion within combustion chamber 16, exhaust means 28 include at least one exhaust valve 36, each driven by a variable valve control 38. Fuel is injected into combustion chamber 16 by a fuel injector 40. Fuel injector 40 directly communicates with combustion chamber 16. During selection of spark-ignition combustion mode, a spark plug 42 produces a spark to initiate combustion of air/fuel mixture within combustion chamber 16. During selection of one of auto-ignition combustion modes, spark plug 42 will not produce any spark. A throttle valve 44 is provided to control air inflow to intake manifold 26.

Various sensors are provided to monitor engine operation conditions. Sensors may include a throttle sensor 48, which provides a throttle position sensor (TPS) signal to C/U 14 to monitor the throttle opening angle or position of throttle valve 44. An accelerator pedal 50 is used to determine the operator or driver torque request command. An accelerator sensor 52 provides a vehicle accelerator pedal opening (VAPO) or pedal position signal indicative of the accelerator pedal opening angle or position of accelerator pedal 50.

Engine 12 includes various other sensors such as a crankshaft sensor 54, which provides a position (POS) signal and a reference (REF) signal C/U 14, and an engine coolant temperature sensor 56. Engine coolant temperature sensor 56 provides an engine coolant temperature (Tw) signal indicative of the engine coolant temperature to C/U 14.

Figure 3:
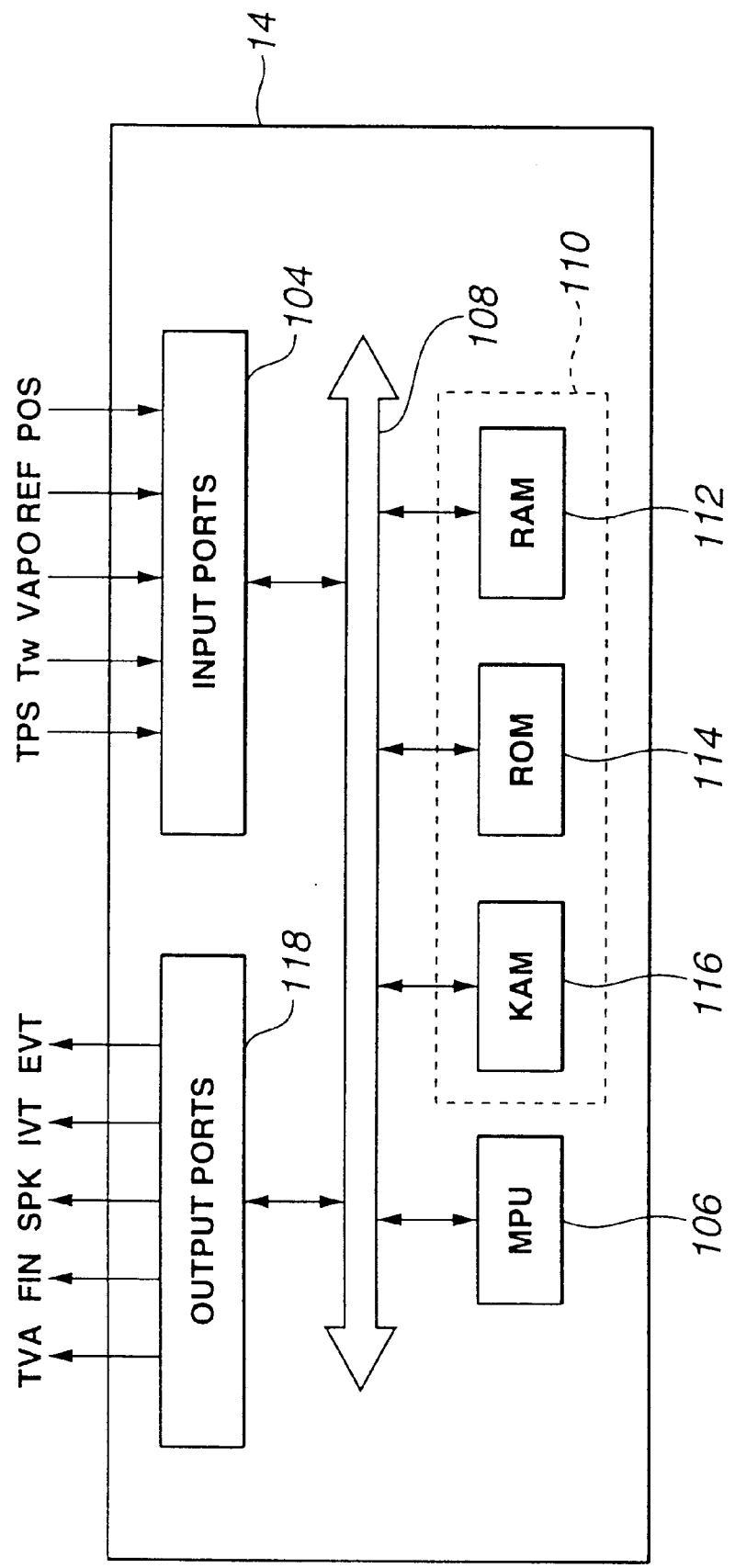
FIG. 3 is a block diagram illustrating a control unit including a computer readable storage media or device.

Referring to FIG. 3, C/U 14 receives signals from the various sensors via input ports 104, which may provide signal conditioning, conversion, and/or fault detection as well known in the art. Input ports 104 communicate with processor (MPU) 106 via a data/control bus 108. MPU 106 implements control logic in the form of hardware and/or software instructions, which may be stored in a computer-readable storage device or media 110 to effect engine 12. Computer-readable media 110 may include various types of volatile and nonvolatile memory such as random-access memory (RAM) 112, read-only memory (ROM) 114, and keep-alive memory (KAM) 116. These functional classifications of memory may be implemented by one or more different physical devices such as PROMs, EPROMs, EEPROMs, flash memory, and the like, depending upon the particular application.

MPU 106 communicates with various actuators of engine 12 via output ports 118. Actuators may control ignition timing or spark SPK, timing and metering of fuel FIN, position of throttle valve TVA to control air inflow, intake valve timing (IVT) and exhaust valve timing (EVT). In operation range where homogeneous charge combustion is required, motor 142 opens PCV 140. In operation range where throttled intake air control is required, the position of throttle valve 44 is variably adjusted by an actuator in the form of a motor 45 to control intake air into combustion chamber 16. In FIG. 1, TVA is used to indicate a control signal to control the throttle position. IVT and EVT are used to designate control signals to control valve timings of intake and exhaust valves, respectively. SPK is used to designate a control signal to control timing of spark.

Intake valve closure timing and exhaust valve opening timing are shifted from a schedule for spark-ignition combustion mode upon selection of one of auto-ignition combustion modes to provide a minus overlap for retaining of exhaust gas around top dead center during exhaust stroke. To carry out a changeover between the valve timing schedule for spark-ignition combustion and the valve timing schedule for auto-ignition combustion, a valve driver with a phase shift of a single cam or a valve driver with a shift between two different cams may be used in each of valve controls 34 and 38. The valve driver of the latter type is described in JP-A 9-203307. If desired, a valve driver employing electromagnetic force may be used. The valve driver of this type is described in U.S. Pat. No. 5,785,016 issued Jul. 28, 1998 to Enderle et al., which has been hereby incorporated by reference.

Figure 2:
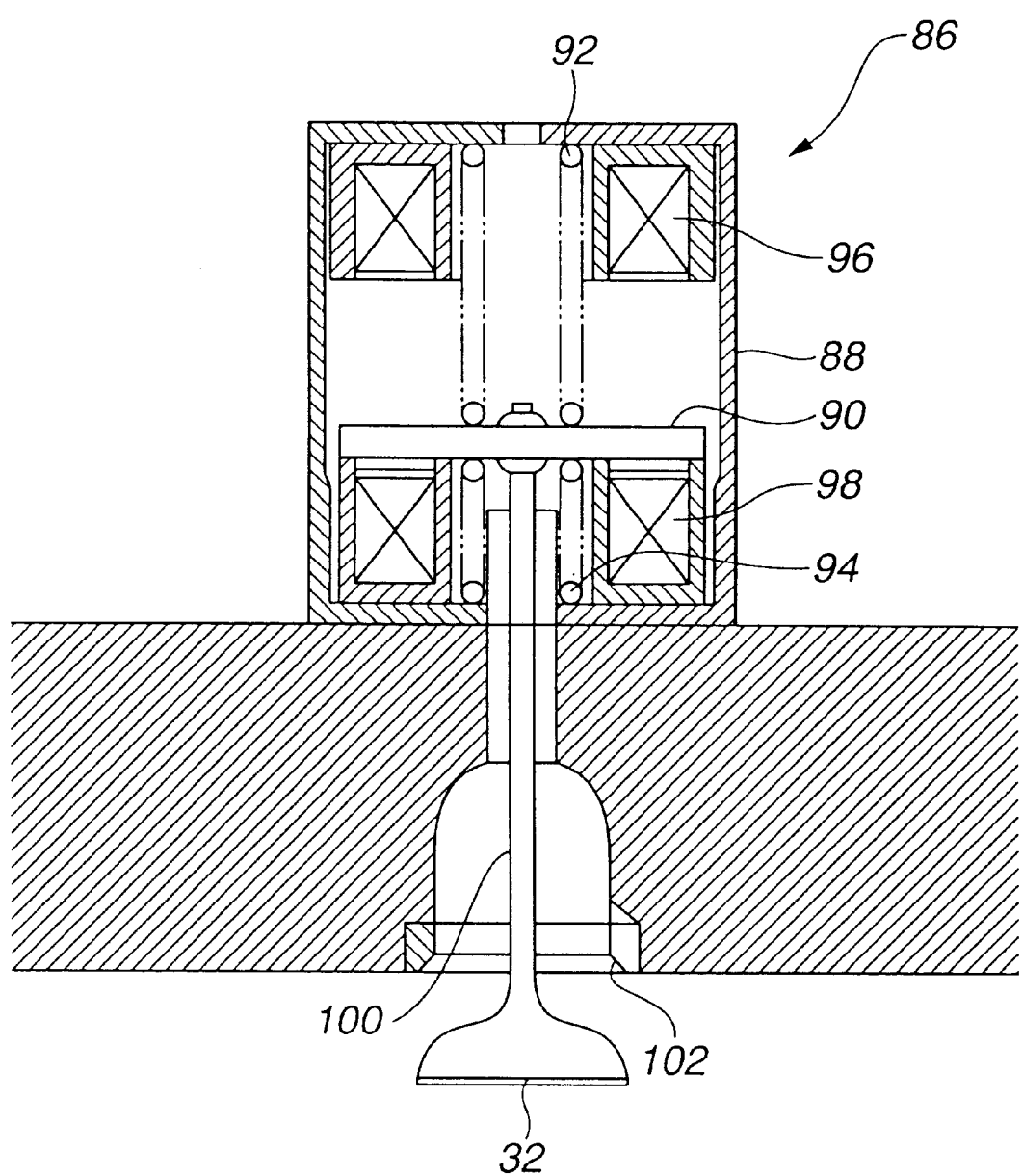
FIG. 2 is a schematic diagram of an electromagnetic driver that may be used in a valve control for driving an intake or exhaust valve.

FIG. 2 provides a schematic view of an electromagnetic valve driver (EVD) 86, which may be used in each of valve controls 34 and 38, for the associated cylinder valve, for example, intake valve 32. EVD 86 includes a housing 88, a movable plate 90 is kept in a neutral position, as illustrated in FIG. 2, within housing 88 by means of two springs 92 and 94. Springs 92 and 94 are arranged on one and the opposite sides of movable plate 90. At the remotest ends, springs 92 and 94 bear against housing 88. At the nearest ends, springs 92 and 94 bear against spaced walls of movable plate 90. Two electromagnetic coils 96 and 98 are mounted to housing 88 on one and the opposite sides of movable plate 90. With no supply of electric current through electromagnetic coil 98, supply of electric current through electromagnetic coil 96 attracts movable plate 90 for movement against the action of spring 92. Supply of electric current through electromagnetic coil 98 with no supply of electric current through electromagnetic coil 96 attracts movable plate 90 for movement against the action of spring 94. In order to transmit at least movement of movable plate 90 in a direction against spring 94 to intake valve 32, the valve stem is coupled to movable plate 90. Thus, with no supply of electric current through electromagnetic coil 96, supply of electromagnetic coil 98 can hold intake valve 32 lifted from its rest position on a valve seat 102. In this example, valve stem 100 is fixed to movable plate 90 so that supply of electric current through electromagnetic coil 96 with interruption of supply of electric current through electromagnetic coil 98 can hold intake valve 32 to the rest position.

FIGS. 4A–4G and 5 illustrate operation of engine 12 during selection of gasoline reform auto-ignition combustion mode. The gasoline reform auto-ignition combustion mode is selected at part load. FIGS. 4A and 4B show early exhaust valve closing. FIGS. 4D and 4E show late intake valve opening. The early exhaust valve closing and late intake valve opening provides minus overlap period where both exhaust and intake valves are closed for retaining of exhaust gas.

As a result of the early exhaust valve closing, a first part of exhaust gas comprising the upper and middle parts of the cylinder content is expelled into an exhaust port during the exhaust stroke as shown in FIG. 4A. A second part of exhaust gas comprising the lower or bottom part of the cylinder content is retained in the cylinder as shown in FIG. 4B and compressed due to movement of piston to TDC position as shown in FIG. 4C. The temperature and pressure of the second part of exhaust gas increase owing to this compression.

Fuel injector 40 (see FIG. 1) is activated to spray fuel, as a first fuel injection, into this high temperature and pressure exhaust gas retained in cylinder. The gasoline fuel injected is partially oxidized into a composition that contains fuel radicals including aldehyde. The duration of time for which the sprayed gasoline is held within the high temperature environment determines the amount of fuel radicals. The earlier the start of the first fuel injection, the more is the amount of fuel radicals. Controlling the duration of time for which the sprayed gasoline is held within high temperature environment can continuously control the amount of fuel radicals.

The compressed fuel and exhaust gas mixture is expanded during an upper part of the subsequent downward piston movement from the TDC position with simultaneous intake and exhaust valve closings as shown in FIG. 4D. The pressure of the mixture drops down to the ambient pressure Pamb (see FIG. 5) at the termination of this expansion.

During the remaining part of the piston downward movement, the intake means 24 is opened to introduce fresh air to perform an intake phase as shown in FIG. 4E.

During a compression stroke, fuel injector 40 is activated to spray gasoline, as a second fuel injection, into the compressed content within the cylinder as shown in FIG. 4F. The dispersion of fuel is suppressed because the fuel is sprayed into the highly condensed cylinder content, forming a localized rich mixture portion (stratified charge).

At or near the piston's TDC during compression stroke, the gasoline of the cylinder content is burned due to compression ignition as shown in FIG. 4G without any help of spark. The sufficient amount of fuel radicals and localized rich mixture formation due to stratification cooperate with each other to accomplish the auto-ignition of gasoline under a relatively low compression ratio as compared to a relatively high compression ratio used in auto-ignition of diesel fuel. The use of such a relatively low compression ratio prevents a drop in torque output during selection of spark-ignition combustion mode at full load.

FIG. 5 graphically represents the variation of cylinder content under the gasoline reform auto-ignition combustion condition. In FIG. 5, the fully drawn curve schematically represents variation of cylinder pressure. After exhaust valve closure (EC), retaining of exhaust gas begins and the pressure of the cylinder content starts to rise above the ambient pressure Pamb (=atmospheric pressure) until the piston reaches TDC during exhaust stroke. Preferably, the start time of first fuel injection is set within an activation range of injection that extends between the initiation of the retaining of exhaust gas to the piston TDC position during exhaust stroke. The compressed cylinder content is expanded due to downward piston movement from the TDC till a point where the cylinder becomes near the ambient pressure Pamb. The timing of intake valve opening (IO) can be set around this point and the timing of intake valve closure (IO) can be set around the piston's bottom dead center (BDC) position during intake stroke. In FIG. 5, P represents pressure and [° CA] represents crank angle. During compression due to upward movement of the piston after the BDC position, the start time of fuel injection is set taking due consideration of cylinder pressure and the fuel delivery pressure.

Figure 6:
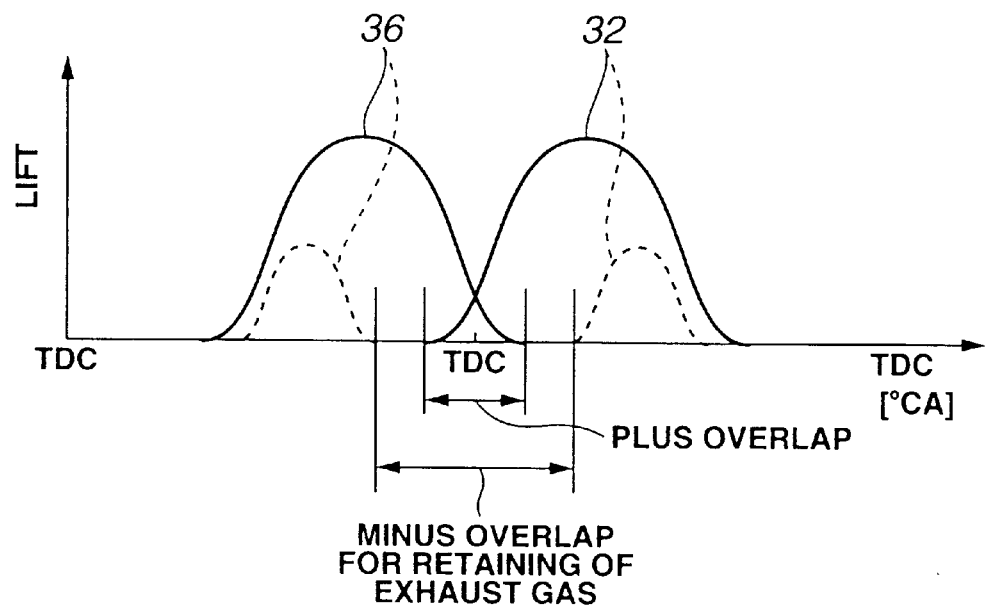
FIG. 6 provides one example of a valve lift diagram, as illustrated by the fully drawn line, of exhaust and intake valves during selection of a spark-ignition combustion mode as compared to a valve lift diagram, as illustrated by the broken line, to achieve retaining of exhaust gas during selection of auto-ignition combustion mode.
Figure 7:
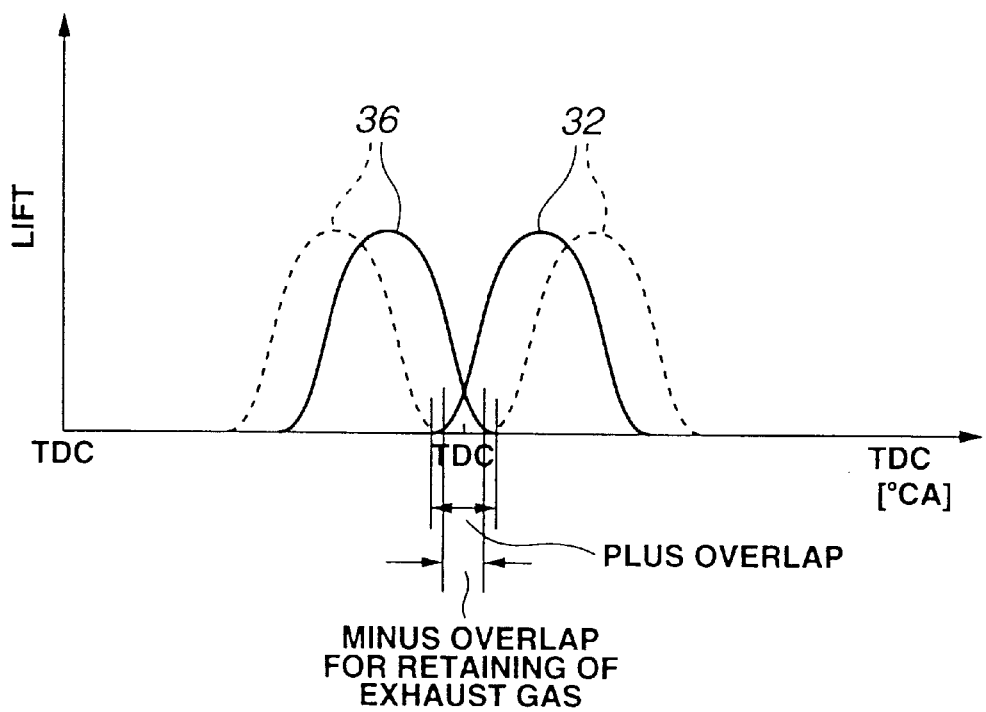
FIG. 7 provides another example of a valve lift diagram, as illustrated by the fully drawn line, of exhaust and intake valves during selection of a spark-ignition combustion mode as well as a valve lift diagram, as illustrated by the broken line, to achieve retaining of exhaust gas during selection of an auto-ignition combustion mode.

FIGS. 6 and 7 provide two examples of valve timings of intake and exhaust valves 36 and 32.

In FIG. 6, the fully drawn curves show a schedule of valve timings used during selection of spark-ignition combustion mode. This schedule is similar to that used for normal 4-stroke cycle spark-ignition gasoline engine. According to this schedule, there is a plus overlap where both exhaust and intake valves 36 and 32 are simultaneously open at around the piston's TDC position during exhaust stroke. In FIG. 6, the broken line curves show a schedule of valve timings used during selection of one of auto-ignition combustion modes. According to this valve-timing schedule, there is a minus overlap where both exhaust and intake valves 36 and 32 are closed at around the piston's TDC position during exhaust stroke. Valve lifts of the exhaust and intake valves 36 and 32 are small according to this valve-timing schedule for auto-ignition combustion as compared to the valve lifts of the valve-timing schedule for spark-ignition combustion. A valve driver using two different cams or a camless valve driver may provide the valve timing schedules as illustrated in FIG. 6.

FIG. 7 provides a valve-timing schedule for spark-ignition combustion and a valve-timing schedule for auto-ignition combustion, which may be provided by a valve driver with a phase shift mechanism of a single cam. In this case, the minus valve overlap is provided by a phase shift and the valve lifts remain unaltered.

Figure 8A:
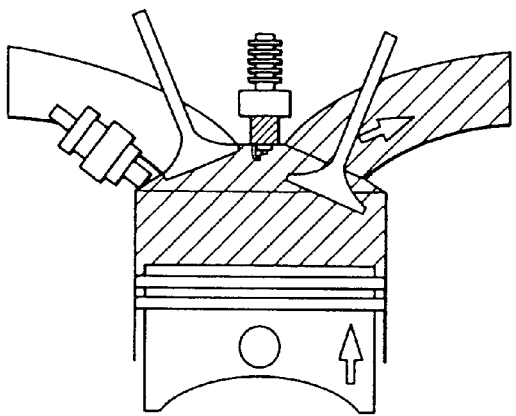
FIG. 8A shows a schematic diagram of cylinder and valves during an exhaust stroke.
Figure 8C:
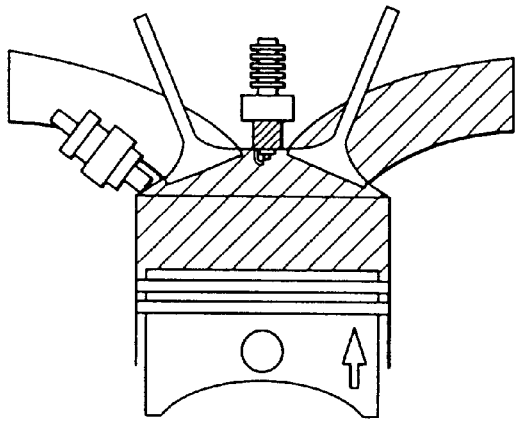
FIG. 8C shows a schematic diagram of cylinder and valves during a compression stroke.
Figure 8B:
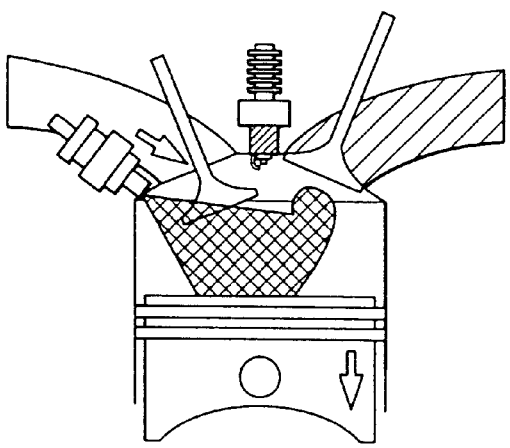
FIG. 8B shows a schematic diagram of cylinder and valves during an intake stroke.
Figure 8D:
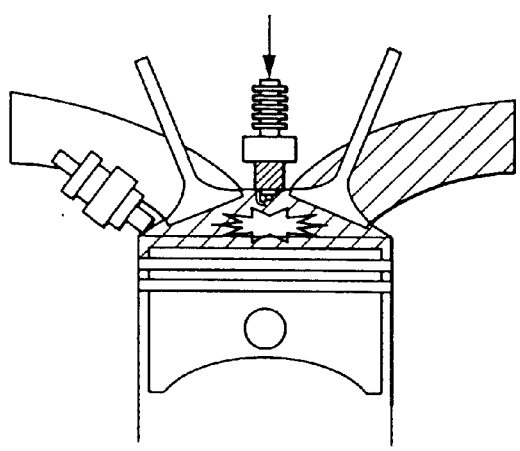
FIG. 8D shows a schematic diagram of cylinder and valves to achieve spark-ignition when piston reaches top dead center during compression stroke.

FIGS. 8A to 8D illustrate operation of engine 12 during selection of spark-ignition homogeneous charge combustion mode. The spark-ignition combustion mode is selected at full load. In the same manner as the operation of 4-stroke spark-ignition gasoline engine, exhaust gas is expelled into the exhaust port during exhaust stroke as a result of exhaust valve closure at the normal timing as shown in FIG. 8A. During intake stroke, fresh air is introduced into the cylinder and the fuel injector is activated to spray fuel into the cylinder as shown in FIG. 8B. The mixture of fuel and air of the cylinder content is compressed during compression stroke as shown in FIG. 8C. At or around the piston's TDC position during compression stroke, the spark plug is activated to provide a spark to initiate burning of the fuel in the cylinder content.

The conditions required to accomplish auto-ignition are explained. The temperature and pressure of the cylinder content, the concentration of fuel within the cylinder content, and the amount of fuel radicals determine whether or not the controlled auto-ignition is achieved. Increasing at least one of the above-mentioned determining factors advances the timing of auto-ignition. If the auto-ignition is advanced excessively, the thermal efficiency of the engine drops. Thus, it is necessary that the initiation timing of auto-ignition is set at or near the piston's TDC position during compression stroke.

Figure 9A:
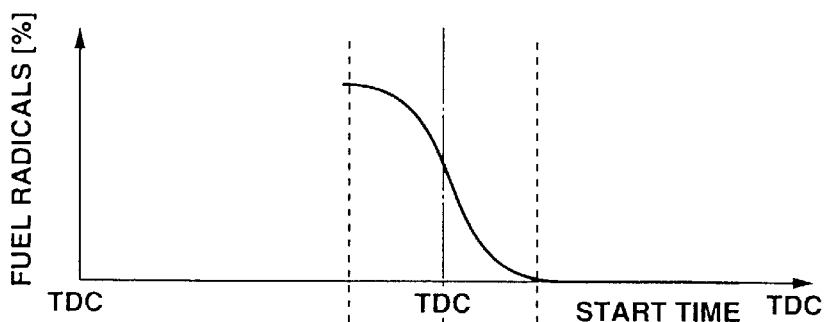
FIGS. 9A and 9B are a graphical representation of variation of amount of fuel radicals against variation of start time of fuel injection and a valve lift diagram of exhaust and intake valves to achieve retaining of exhaust gas, respectively.
Figure 9B:
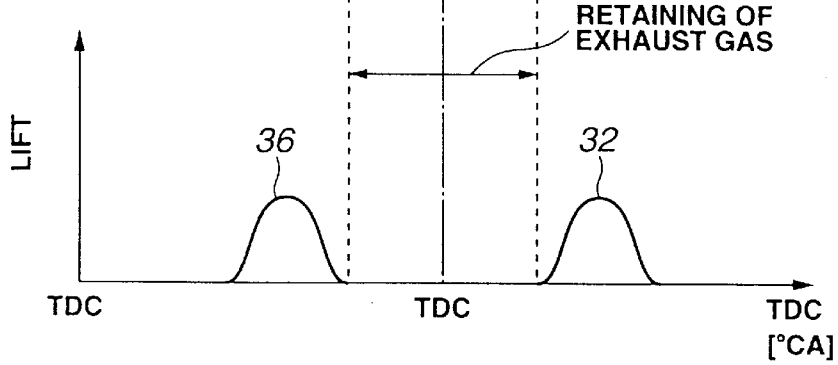

FIGS. 9A and 9B provide schematic graphical representation of the variation of fuel radicals produced against variation of injection start time during retaining of exhaust gas. The earlier the injection start time is, the more the amount of fuel radicals is. This is because advancing the injection start time results in an increase in duration of time for which the fuel is subjected to high temperature and pressure environment.

Figure 10:
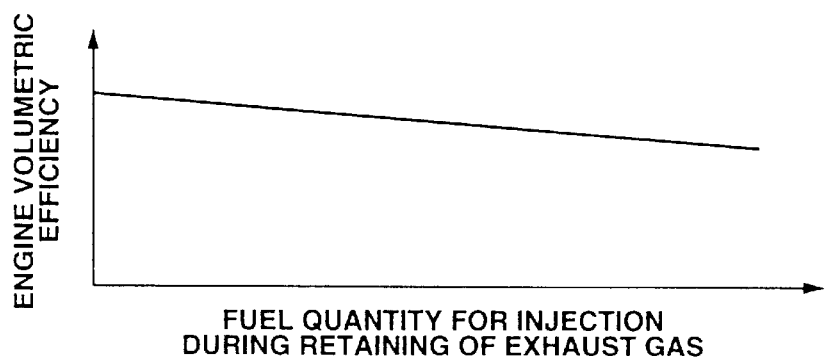
FIG. 10 illustrates graphically variation of engine volumetric efficiency against variation of quantity of fuel for fuel injection during retaining of exhaust gas.

FIG. 10 provides schematic graphical representation of the variation of engine volumetric efficiency against the variation of fuel quantity sprayed, as the first fuel injection, into the cylinder during retaining of exhaust gas. Increasing the fuel quantity sprayed during retaining of exhaust gas increases generation of heat Increased heat generation causes a drop in the amount of fresh air introduced during the subsequent intake stroke, resulting in drop in volumetric efficiency. To maintain the volumetric efficiency at a reasonable level, the fuel quantity for the first fuel injection should be suppressed to a sufficiently low level To produce a sufficiently large amount of fuel radicals with a small fuel quantity, it is necessary that the start time of the first fuel injection is set within the activation range between the exhaust valve closure to the piston's TDC during exhaust stroke as shown in FIG. 5.

The term "total fuel quantity" is herein used to mean the total of fuel quantity for the first fuel injection and fuel quantity for the second fuel injection during selection of premised auto-ignition combustion mode. This terminology is used also to mean the fuel quantity of fuel sprayed for a single injection during selection of one of auto-ignition stratified charge combustion mode, auto-ignition homogeneous charge combustion mode, and spark-ignition combustion mode.

Figure 11:
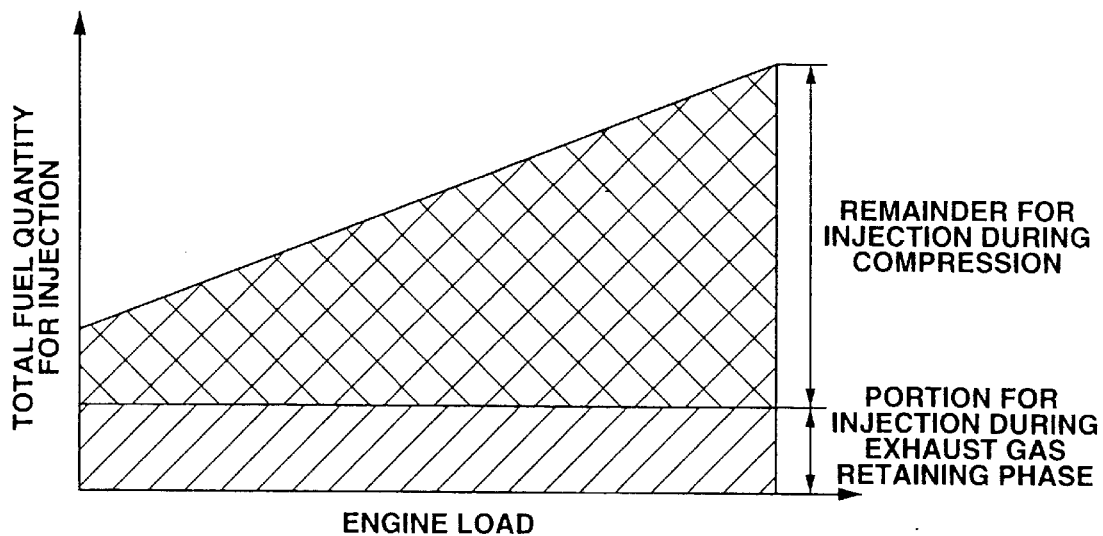
FIG. 11 illustrates graphically variation of total fuel quantity against variation of engine load and one example of distribution between a portion of total fuel quantity for fuel injection during retaining of exhaust gas and the remainder of the total fuel quantity for fuel injection during compression.
Figure 12:
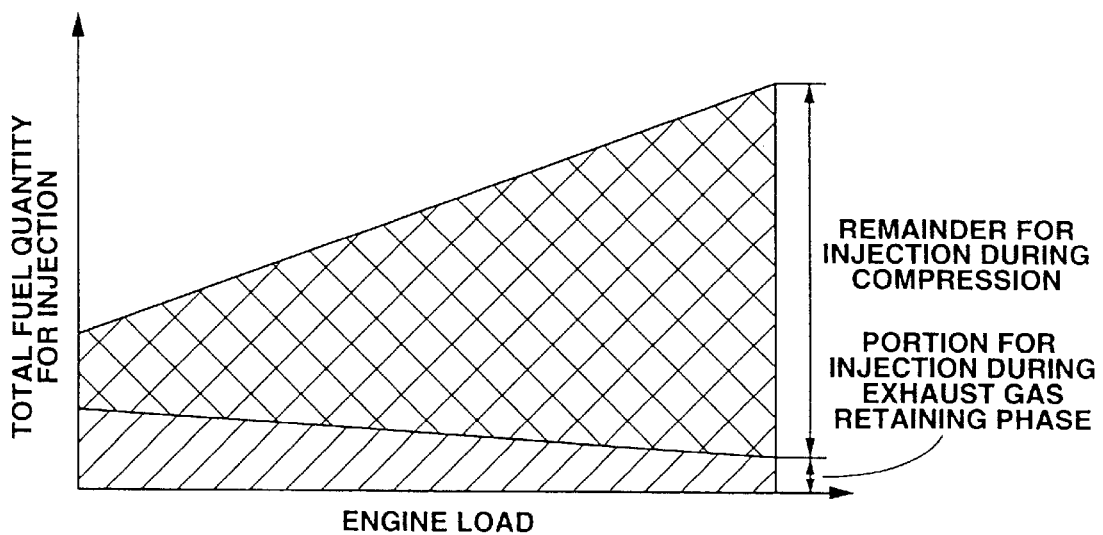
FIG. 12 is a similar graphical representation to FIG. 11, illustrating another example of distribution between a portion of total fuel quantity for fuel injection during retaining of exhaust gas and the remainder of the total fuel quantity for fuel injection during compression.

FIGS. 11 and 12 provide schematic graphical representations of the same variation of total fuel quantity against variation of engine load, but with different patterns of distribution of fuel between the first and second fuel injections. As the first fuel injection during retaining of exhaust gas, a portion of the total fuel quantity is sprayed. Subsequently, the remainder of the total fuel quantity is sprayed, as the second fuel injection, during compression stroke. For stable auto-ignition of gasoline under a relatively low compression ratio used for normal spark-ignition gasoline engine, a certain amount of fuel radicals represented by aldehyde is needed depending upon engine speed and compression ratio. This has been empirically confirmed.

In both of the cases shown in FIGS. 11 and 12, the engine load determines the total fuel quantity such that increasing the engine load increases the total fuel quantity. In other words, the total fuel quantity of proportional to the engine load.

In the case of FIG. 11, the distribution between the first and second fuel injections is such that the portion for injection during exhaust gas retaining phase is substantially invariable with variation of the engine load and the remainder for injection during compression stroke is proportional to the engine load. The fuel quantity for the injection during retaining of exhaust gas is kept constant over the whole range of variation of engine load to provide sufficiently large amount of fuel radicals for stable auto-ignition. Since the fuel quantity is kept constant, fuel quantity management can be simplified.

The distribution pattern shown in FIG. 12 is intended to enhance the engine volumetric efficiency. In this case, the portion of the total fuel quantity sprayed during exhaust gas retaining phase is inversely proportional to the engine load. In other words, the portion for injection during exhaust gas retaining phase decreases as the engine load increases to prevent a drop in volumetric efficiency. The remainder of the total fuel quantity for injection during compression stroke increases as the engine load increases.

The duration of time for which the sprayed fuel is oxidized is unaltered against variation of engine speed so that the timing of auto-ignition varies with regard to crank angle position as the engine speed varies. If the engine speed is increased, the timing of auto-ignition retards. If the engine speed is decreased, the auto-ignition timing advances. Thus, obtaining the appropriate timing of auto-ignition over wide range of engine speed requires adequate control of the amount of fuel radicals. To accomplish this end, it is one measure to increase the quell quantity for the first fuel injection, i.e., the portion of the total fuel quantity for injection during exhaust gas retaining phase, as the engine speed increases to produce increased amount of fuel radicals for promotion of auto-ignition.

Figure 13:
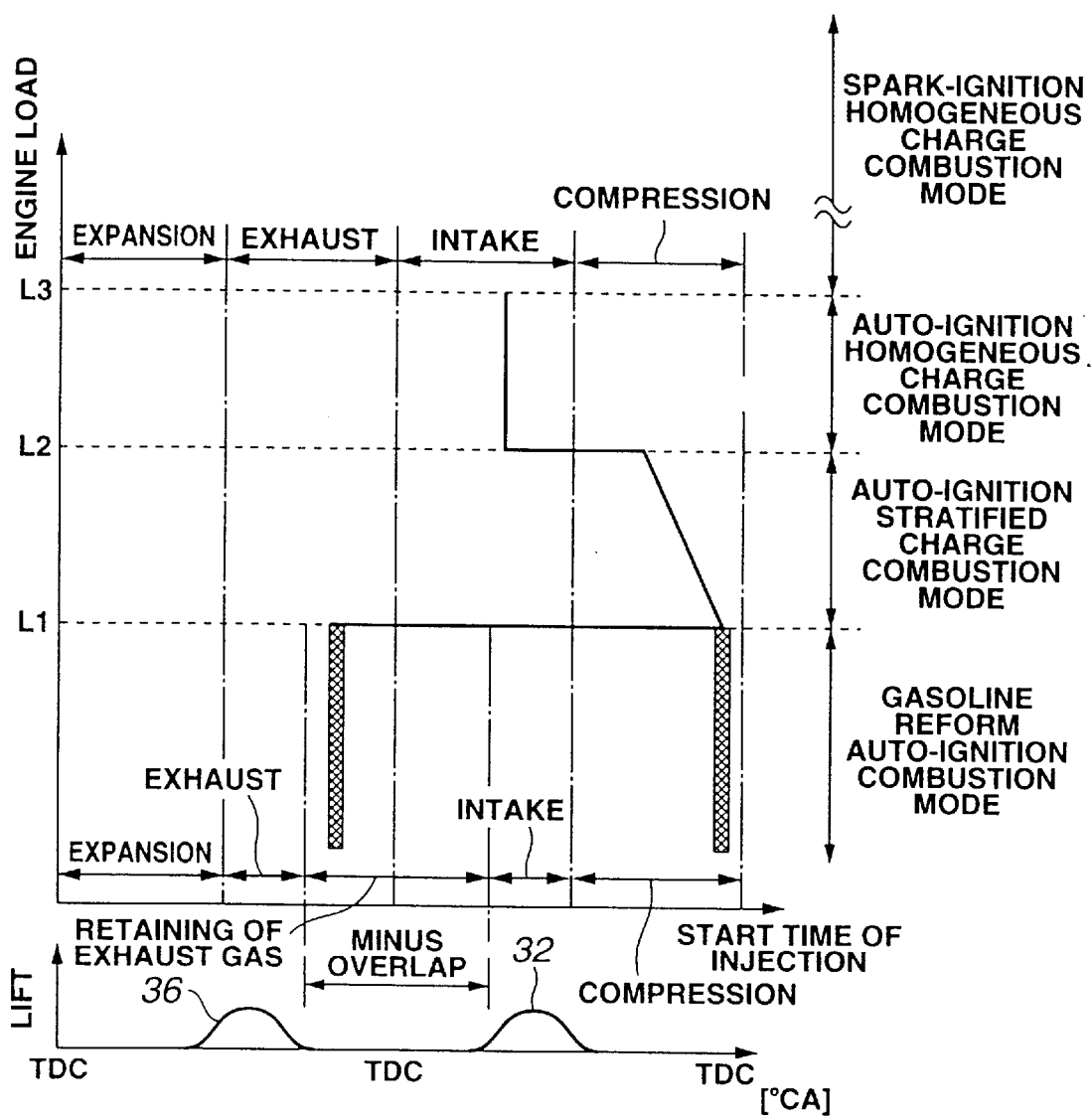
FIG. 13 illustrates graphically a first schedule of variation of fuel injection timings against different combustion modes that are selected in response to the engine load.

FIG. 13 provides graphical representation of fuel injection timings of the engine 12 against variation of the engine load L. As mentioned before, the engine is operated in one of the four different combustion modes. Control unit 14 (see FIG. 1) selects one of gasoline reform auto-ignition combustion mode, auto-ignition stratified charge combustion mode, auto-ignition homogeneous charge combustion mode, and spark-ignition homogeneous charge combustion mode in response to an operating parameter indicative of the engine load. The engine load indicative operating parameter is calculated in response to accelerator pedal position VAPO (see FIG. 1) and the engine speed. The control unit 14 calculates the engine speed in response to the position and reference signals POS and REF from crankshaft sensor 54 (see FIG. 1).

As shown in FIG. 13, when the engine load L is less than a first predetermined value L1, control unit 14 selects gasoline reform auto-ignition combustion mode. During selection of gasoline reform auto-ignition combustion mode, control unit 14 adjusts opening and closing timings of intake means 24 including intake valve 32 and those of exhaust means 28 including exhaust valve 36 such that piston 20 reciprocates to perform an exhaust phase, an exhaust gas retaining phase, an intake phase, a compression phase, and an expansion phase. This adjustment of opening and closing timings of exhaust and intake valves 36 and 32 is held during selection of the other two auto-ignition combustion modes. When the engine load L exceeds the first predetermined value L1, but fails to exceed a second predetermined value L2 that is greater that the first predetermined value L1, control unit 14 selects auto-ignition stratified charge combustion mode. When the engine load L exceeds the second predetermined value L2 but fails to exceeds a third predetermined value L3 that is greater than the second predetermined value L2, control unit 14 selects auto-ignition homogeneous charge combustion mode. When the engine load L exceeds the third predetermined value L3, control unit 14 selects spark-ignition homogeneous charge combustion mode. During selection of spark-ignition combustion mode, control unit 14 adjusts opening and closing timings of intake means 24 including intake valve 32 and those of exhaust means 28 including exhaust valve 36 such that piston 20 reciprocates to perform an exhaust phase, an intake phase, a compression phase, and an expansion phase. Under this condition, there is no minus overlap of exhaust and intake valves so that there is no retaining of exhaust gas at or near piston's TDC position during exhaust stroke.

During selection of gasoline reform auto-ignition combustion mode, control unit 14 the start time of fuel injection during the exhaust gas retaining phase and the start time of fuel injection during the compression phase invariable against variation in the engine load. As discussed before in connection with FIGS. 11 and 12, the total fuel quantity is determined in response to the engine load and shared into the portion for fuel injection during exhaust gas retaining phase and the remainder for fuel injection during compression phase. Control unit 14 performs operation to determine the total fuel quantity and operation to determine the portion of and the remainder of the total fuel quantity. Control unit 14 determines a first fuel injection control signal having a pulse width indicative of the portion of the total fuel quantity and a second fuel injection control signal having a pulse width indicative of the remainder of the total fuel quantity. The first fuel injection control signal is applied to the fuel injector 40 at the start time of the first injection during exhaust gas retaining phase to control fuel quantity injected. The second fuel injection control signal is applied to the fuel injector 40 at the start time of the second fuel injection during compression phase to control fuel quantity injected. Production of fuel radicals due to oxidation of fuel sprayed during the first and second fuel injections provide stable auto-ignition at appropriate crank angle position at or near the piston's TDC position during compression stroke.

If the engine load L exceeds the first predetermined value L1, the auto-ignition stratified charge combustion mode is selected. Under this load condition, the localized fuel concentration due to stratified operation provides sufficiently condensed fuel for auto-ignition. Thus, injection of fuel during compression phase under stratified charge condition can achieve stable auto-ignition. The auto-ignition stratified charge combustion is advantageous over the gasoline reform auto-ignition combustion in that HC emission due to cylinder wall quenching is low. This is the reason why the auto-ignition stratified combustion mode is employed.

During selection of auto-ignition stratified charge combustion mode, control unit 14 provides start time of fuel injection during compression phase. As shown in FIG. 13, when the engine load L exceeds the first predetermined value L1, a shift from the start time of the compression phase injection during selection of gasoline reform auto-ignition combustion mode to the start time of the compression phase injection during selection of auto-ignition stratified charge combustion mode is zero. Control unit 14 adjusts the start time of fuel injection during compression phase in response to the engine load such that this start time advances as the engine load increase. This adjustment of the start time of the compression phase injection is required because increasing of total fuel quantity as the engine load increases will cause formation of excessively rich mixture if the start time is not advanced, thereby to cause emissions of nitrogen oxides (NOx) and smoke. To avoid the emissions of NOx and smoke, the start time of the compression phase fuel injection is advanced as the total fuel quantity is increased in response to the engine load, thereby to promote dispersion of fuel within the cylinder content to keep the air/fuel ratio of the localized mixture within an acceptable range by the time the piston reaches TDC position during compression stroke. The dispersion of fuel is promoted if the fuel is sprayed at an advanced timing when the cylinder pressure is still low at the initial part of compression phase. During selection of auto-ignition stratified charge combustion mode, control unit 14 determines a fuel injection control signal having pulse width indicative of the total fuel quantity and applies this fuel injection control signal to fuel injector 40 at the start time of fuel injection during compression phase.

If the engine load L further increases and exceeds the second predetermined value L2, control unit 14 selects auto-ignition homogeneous combustion mode. During selection of auto-ignition homogeneous charge combustion mode, control unit 14 provides start time of fuel injection during intake phase and holds this start time invariable against variation in the engine load. Control unit 14 determines a fuel injection control signal having pulse width indicative of the total fuel quantity and applies this fuel injection control signal to fuel injector 40 at the start time of fuel injection during intake phase.

If the engine load L further increases and exceeds the third predetermined value L3, control unit 14 selects spark-ignition homogenous charge combustion mode. Under this engine load condition, control unit 14 activates spark plug 42 for generation of spark at or near piston's TDC position during compression phase. During selection of spark-ignition homogeneous charge combustion mode, control unit 14 provides start time of fuel injection during intake phase and holds this start time invariable against variation in the engine load. Control unit 14 determines a fuel injection control signal having pulse width indicative of the total fuel quantity and applies this fuel injection control signal to fuel injector 40 at the start time of fuel injection during intake phase. At or near the piston's TDC position during compression stroke, spark-ignition initiates burning of fuel.

Figure 14:
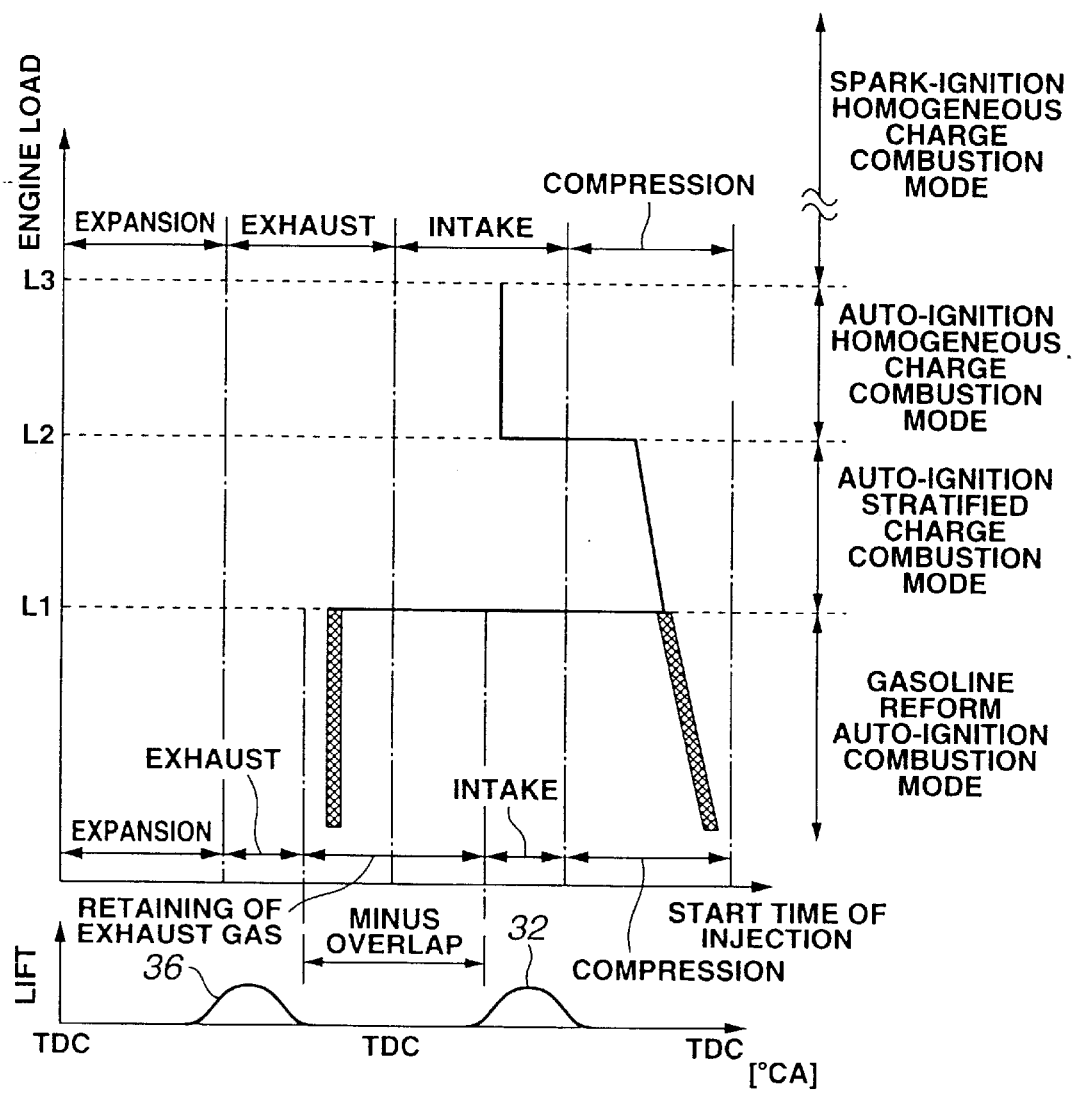
FIG. 14 illustrates graphically a second schedule of variation of fuel injection timings against different combustion modes that are selected in response to the engine load.
Figure 15:
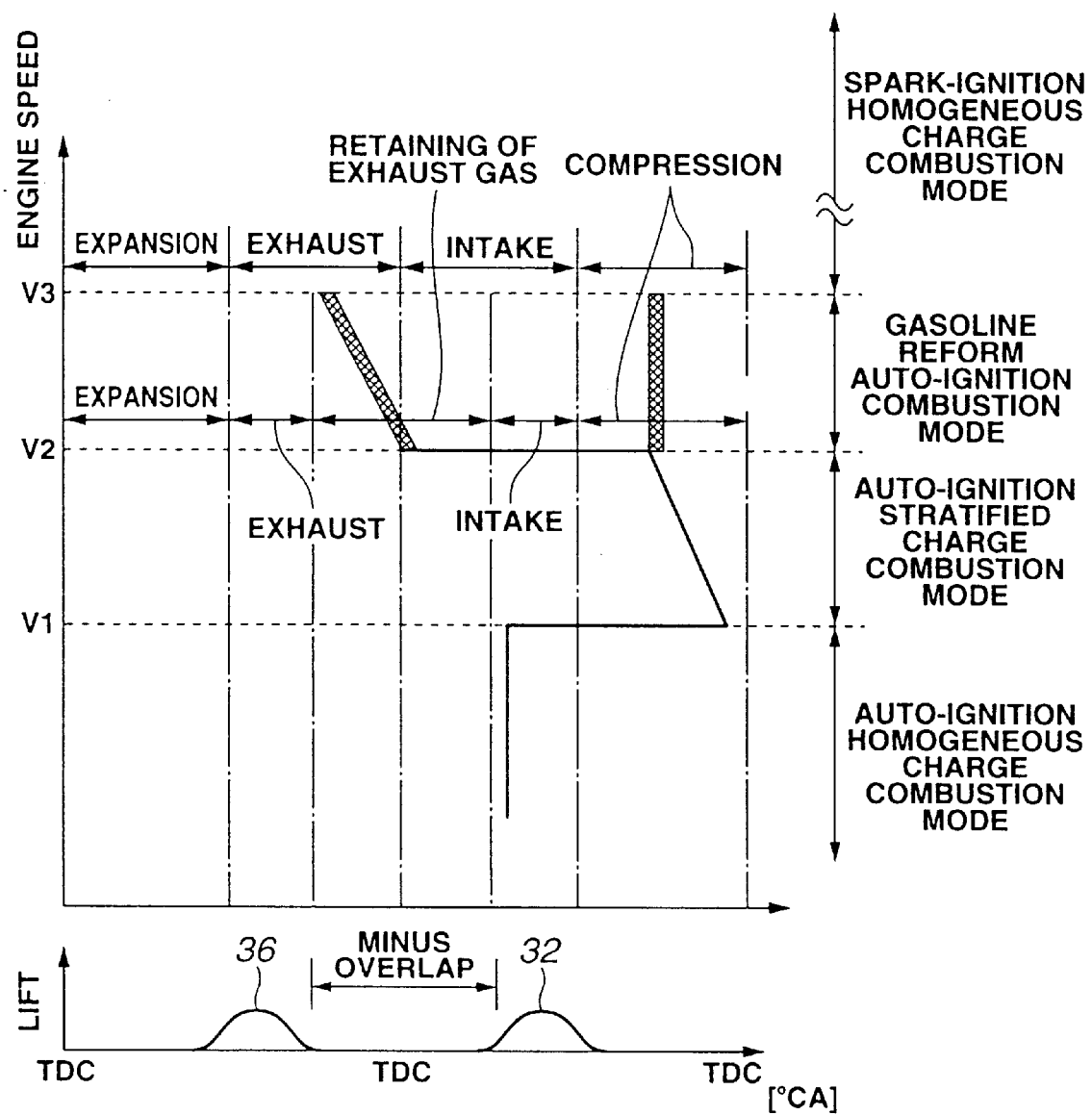
FIG. 15 illustrates graphically a third schedule of variation of fuel injection timings against different combustion modes that are selected in response to the engine speed.
Figure 16:
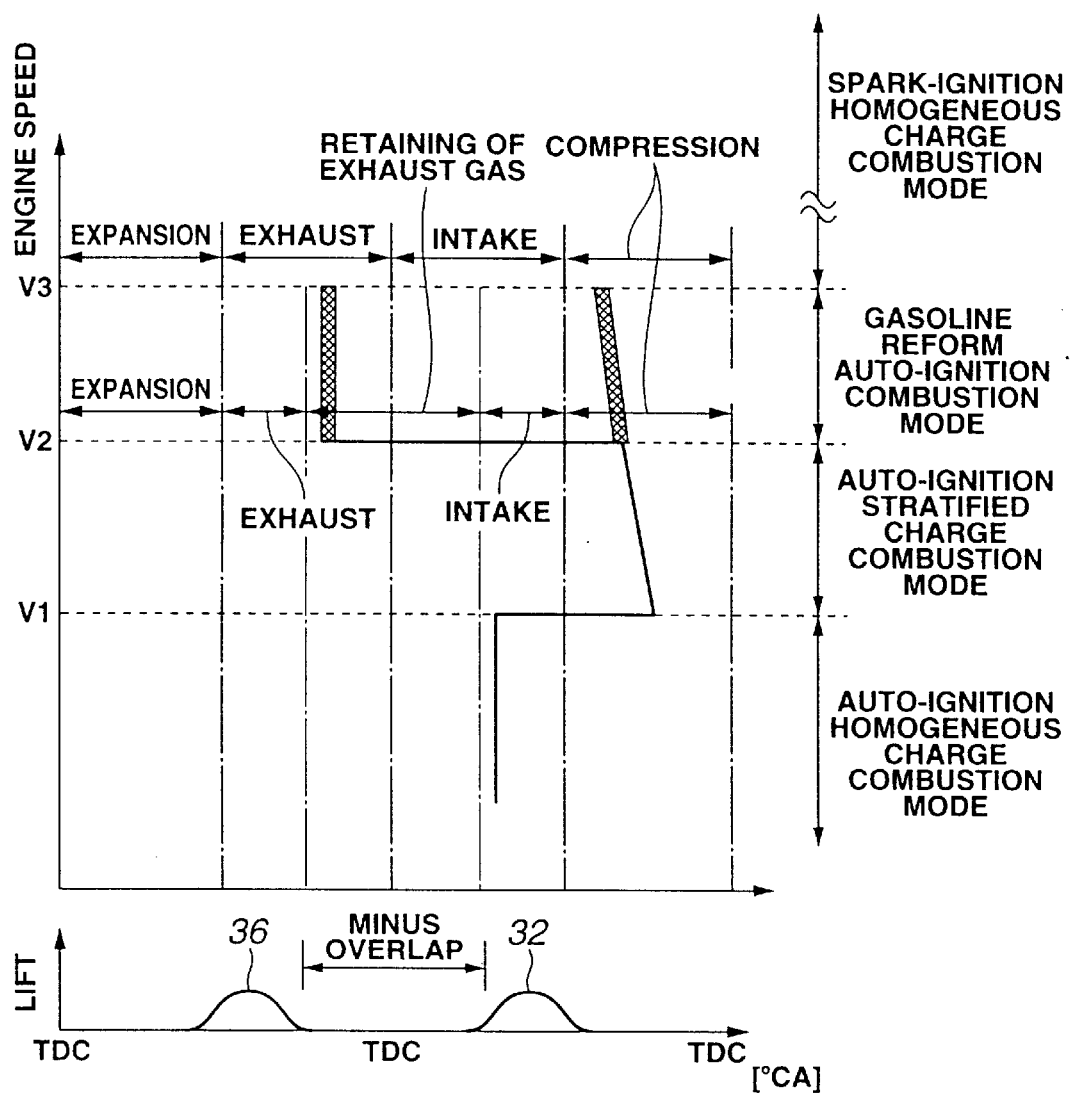
FIG. 16 illustrates graphically a fourth schedule of variation of fuel injection timings against different combustion modes that are selected in response to the engine speed.

In the injection pattern illustrated in FIG. 13, the start time of the second fuel injection during compression phase is held invariable against variation in the engine load during selection of gasoline reform auto-ignition combustion mode. In a modified pattern of fuel injections illustrated in FIG. 14, control unit 14 adjusts the start time of the second fuel injection during compression phase in response to the engine load during selection of gasoline reform auto-ignition combustion mode such that the start time advances as the engine load increases. As will be appreciated from FIG. 14, the start time of fuel injection during compression phase advances in a continuous manner as the engine load increases over the engine load range extending from gasoline reform auto-ignition combustion mode to auto-ignition stratified charge combustion mode. The reason for setting of such adjustment of the start time of the second fuel injection during selection of gasoline reform auto-ignition combustion mode is the same as the reason for setting of adjustment of the start time pf the compression phase fuel injection during selection of auto-ignition stratified charge combustion mode, In FIGS. 13 and 14, the operation parameter indicative of the engine load L has been employed in selection among three different auto-ignition combustion modes. In FIGS. 15 and 16, an operation parameter indicative of the engine speed V is used to select the three different auto-ignition modes and the spark-ignition homogeneous combustion mode.

In FIG. 15, when the engine speed V is less than a first predetermined value V1, control unit 14 selects the auto-ignition homogenous charge combustion mode having a fuel injection during intake phase. Time that passes from the fuel injection during intake phase to the piston's TDC position during compression stroke decreases as the engine speed increases. When the engine speed V is less than the first predetermined value V1, it is long enough for the fuel sprayed during intake phase to be oxidized to contain sufficient amount of fuel radicals before the piston reaches the TDC position. Thus, fuel injection during intake phase and homogeneous charge cooperate with each other to achieve auto-ignition at or near the piston's TDC position during compression stroke.

When the engine speed V exceeds the first predetermined value V1 but fails to exceed a second predetermined value V2 that is higher than the value V1, control unit 14 selects the auto-ignition stratified charge combustion having a fuel injection during compression phase. The fuel sprayed under high pressure condition is concentrated. This concentration of fuel promotes progress of oxidation, thereby to achieve auto-ignition at or near the piston's TDC position during compression stroke. It has been confirmed that, at the same engine speed above the first predetermined value V1, the concentration of fuel due to fuel injection during compression phase under stratified charge condition is superior, in speed of oxidation reaction, to the dispersion of fuel due to fuel injection during intake phase under homogeneous charge condition.

When the engine speed V exceeds the second predetermined value V2 but fails to exceed a third predetermined value V3 that is higher than the value V2, control unit 14 selects the gasoline reform auto-ignition combustion mode having a first fuel injection during exhaust gas retaining phase and a second fuel injection during compression phase. It has been confirmed that, at the same engine speed between the first and second predetermined values V1 and V2, the auto-ignition stratified charge combustion provides less HC emissions due to wall quenching than the gasoline reform auto-ignition combustion. Thus, the auto-ignition stratified combustion mode is employed during operation at engine speed that exceeds the first predetermined value V1 but fails to exceed the second predetermined value V2. However, when the engine speed V exceeds the second predetermined value V2, the single fuel injection during compression phase cannot achieve stable auto-ignition so that the gasoline reform auto-ignition combustion mode is selected to achieve stable auto-ignition at or near the piston's TDC position during compression stroke.

When the engine speed V exceeds the third predetermined value V3, control unit 14 selects the spark-ignition homogeneous combustion mode having a fuel injection during intake phase.

The adjustment of opening and closing timings of exhaust and intake valves 36 and 32 during selection of any one of three different auto-ignition combustion modes in accordance with the schedule as illustrated in FIG. 15 is the same as that during the selection in accordance with the schedule as illustrated in FIG. 13. The adjustment of opening and closing timings of exhaust and intake valves 36 and 32 during selection of the spark-ignition homogeneous charge combustion mode in accordance with the schedule as illustrated in FIG. 15 is the same as that during the selection in accordance with the schedule as illustrated in FIG. 13.

The adjustment of fuel injection timings during selection of one of auto-ignition homogeneous charge combustion, auto-ignition stratified charge combustion mode, and spark-ignition homogeneous charge combustion mode in accordance with the schedule as illustrated in FIG. 15 is the same as that during the selection in accordance with the schedule as illustrated in FIG. 13.

As shown in FIG. 15, during the selection of gasoline reform auto-ignition combustion mode, control unit 14 adjusts the start time of fuel injection during the exhaust gas retaining phase in response to the engine speed such that the start time advances as the engine speed increases and holds the start time of fuel injection during the compression phase invariable against variation in the engine speed. Advancing the start time of fuel injection during exhaust gas retaining phase in response to the engine speed provides duration of time long enough for sufficient promotion of oxidation.

Instead of advancing the start time of fuel injection during exhaust gas retaining phase, the start time of fuel injection during compression phase may be advanced in response to the engine speed V as illustrated in FIG. 16. FIG. 16 is substantially the same as FIG. 15, except the fuel injection timings during selection of gasoline reform auto-ignition combustion mode. In FIG. 16, during selection of gasoline reform auto-ignition combustion mode, control unit 14 holds the start time of fuel injection invariable against variation in engine speed and adjusts the start time of fuel injection during compression phase in response to the engine speed such that the start time of this fuel injection advances as the engine speed increases.

FIG. 17 is a block diagram of the control unit 14. At an engine speed calculation block 200, engine speed is calculated based on POS and REF signals from crankshaft sensor 54. The engine speed is fed to an engine load calculation block 202. At block 202, the engine load is calculated based on the engine speed and acceleration pedal position VAPO. The engine load is fed to a combustion mode selection block 204. At block 204, one of gasoline reform auto-ignition combustion mode, auto-ignition stratified charge combustion mode, auto-ignition homogeneous charge combustion mode, and spark-ignition combustion mode is selected in accordance with the schedule as illustrated in FIGS. 13 or 14. The information as to the selected combustion mode is supplied to an injection timing setpoint 206, a valve timing setpoint 208, a charge type setpoint 210 and an ignition type setpoint 212. The engine load is fed to the injection timing setpoint 206. The engine load is fed also to a total fuel quantity determination block 213. At block 213, the total fuel quantity is determined in a manner described in connection with FIGS. 11 and 12.

At setpoint 206, there are four maps 206a, 206b, 206c and 206d. Map 206a contains data on start times of first and second fuel injections for gasoline reform auto-ignition combustion mode as illustrated in FIGS. 13 or 14 or 15 or 16. Map 206b contains data on start time of fuel injection during compression phase for auto-ignition stratified charge combustion mode as illustrated in FIGS. 13 or 14 or 15 or 16. Map 206c contains data on start time of fuel injection during intake phase for auto-ignition stratified combustion mode as illustrated in FIGS. 13 or 14 or 15 or 16. Map 206d contains data on start time of fuel injection during intake phase for spark-ignition homogeneous charge combustion mode as illustrated in FIGS. 13 or 14 or 15 or 16.

At setpoint 208, there are four maps 208a, 208b, 208c and 208d. Maps 208a, 208b and 208c contain the same data on opening and closing timings of exhaust and intake valves to provide retaining of exhaust gas for the auto-ignition combustion modes. Map 208d contains data on opening and closing timings of exhaust and intake valves to provide normal four-stroke cycle without the exhaust gas retaining phase for the spark-ignition combustion mode.

At setpoint 212, there are four maps 212a, 212b, 212c and 212d. Maps 212a, 212b and 212c contains instructions on rendering spark plug inoperable for auto-ignition used in the auto-ignition combustion modes. Map 212d contains data on spark timings for spark-ignition used in spark-ignition combustion mode.

During selection of gasoline reform auto-ignition combustion mode, data from maps 206a, 208a, and 212a are fed to fuel injector controller 214, valve timing controller 216, and spark plug controller 220, respectively. During selection of auto-ignition stratified charge combustion mode, data from maps 206b, 208b, and 212b are fed to controllers 214, 216, and 220, respectively. During selection of auto-ignition homogeneous charge combustion mode, data from maps 206c, 208c, and 212c are fed to controllers 214, 216, and 220, respectively. During selection of spark-ignition homogeneous charge combustion mode, data from maps 206d, 208d, and 212d are fed to controllers 214, 216, and 220, respectively.

Controller 214 determines the pulse width of fuel injection control signal in response to the determined total fuel quantity and applies the signal FIN to fuel injectors 40 at the determined timing. Controller 216 determines and applies signals INT and EVT to intake and exhaust valve controllers 34 and 38 to adjust opening and closing timings of intake and exhaust valves. Controller 220 applies a control signal SPK to spark plug 42 during selection of spark-ignition homogeneous charge combustion mode only.

Figure 18A:
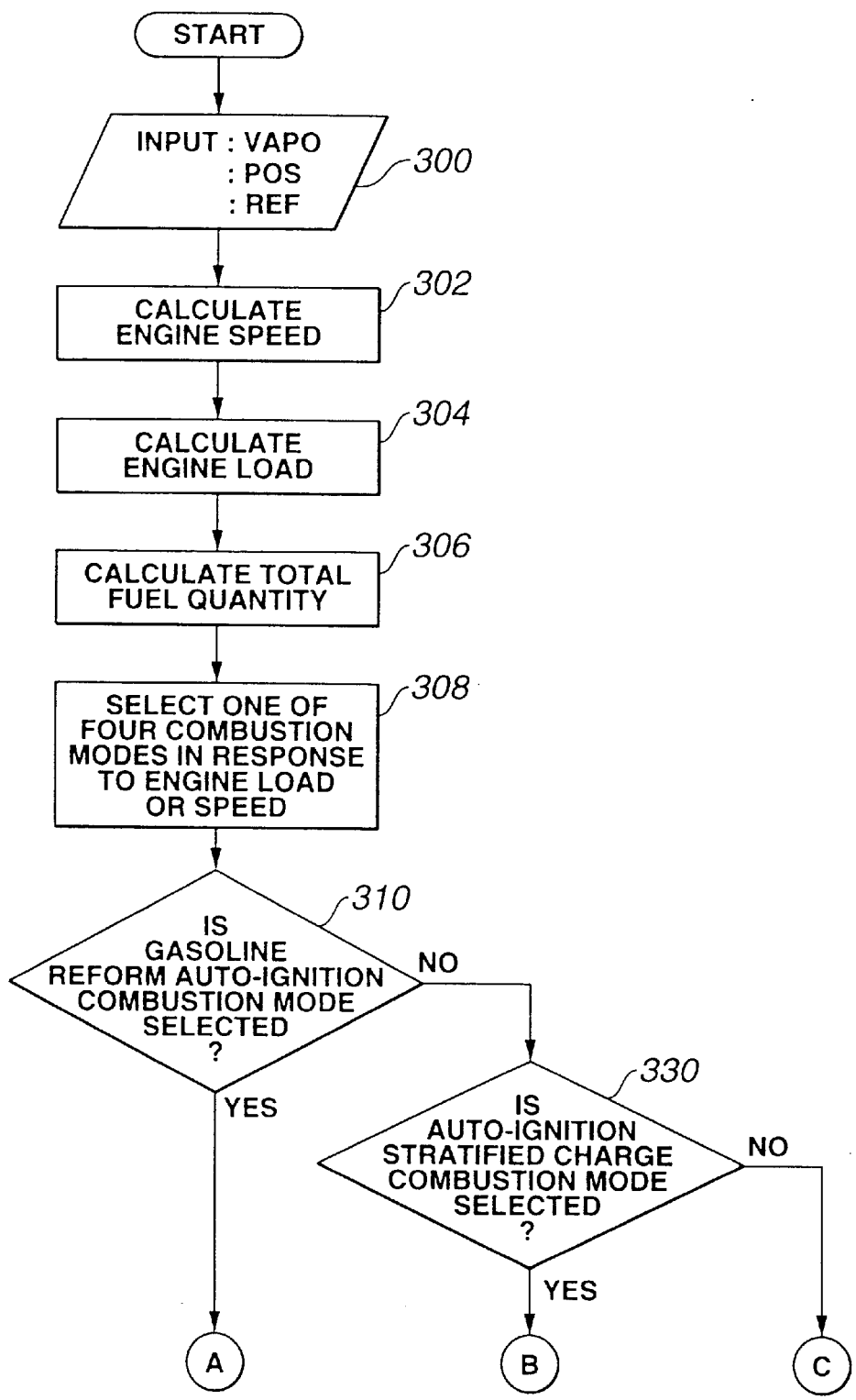
FIGS. 18A, 18B and 18C show a flowchart illustrating control logic for operation during auto-ignition combustion modes and spark-ignition combustion mode.
Figure 18B:
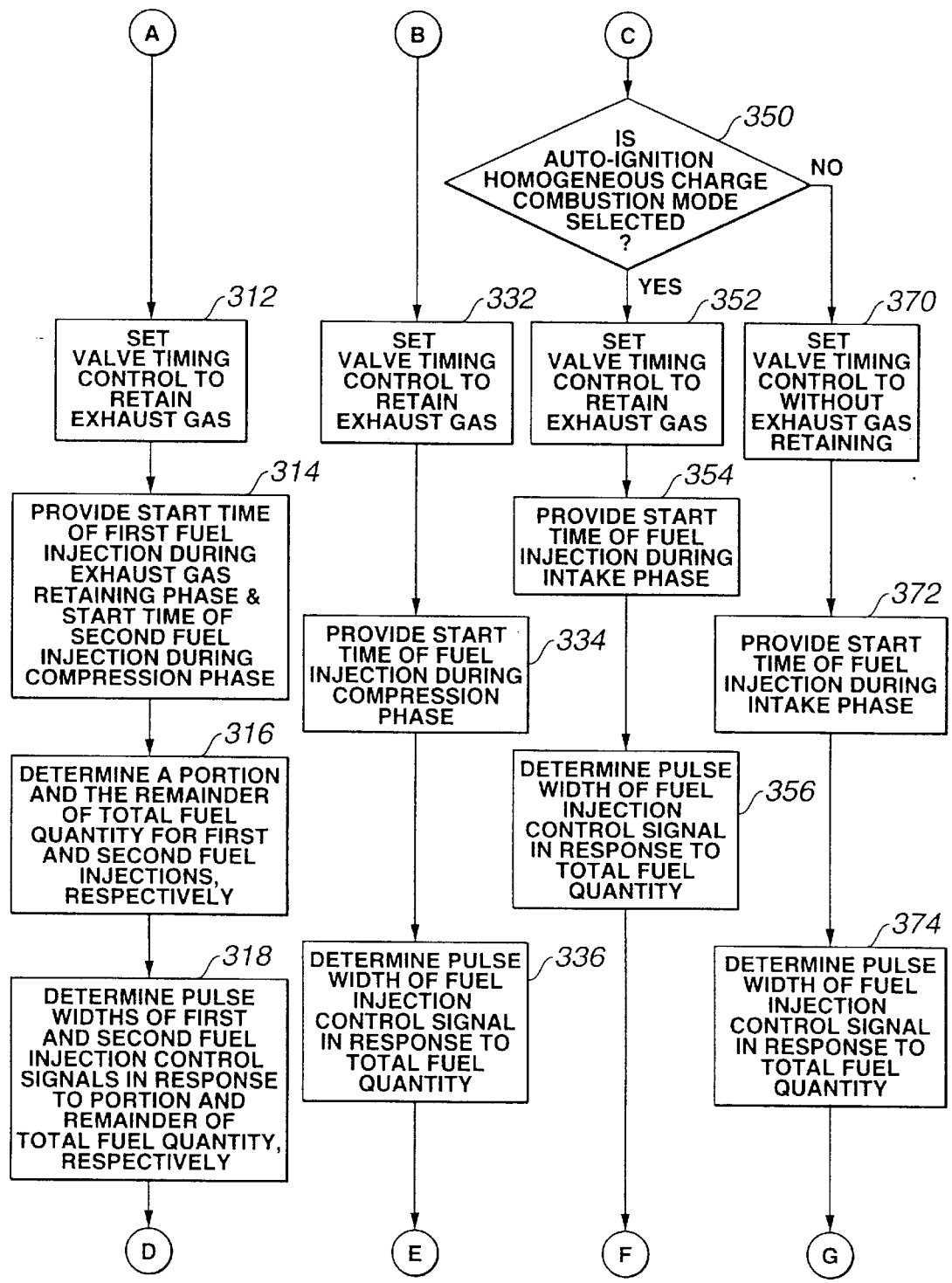
Figure 18C:
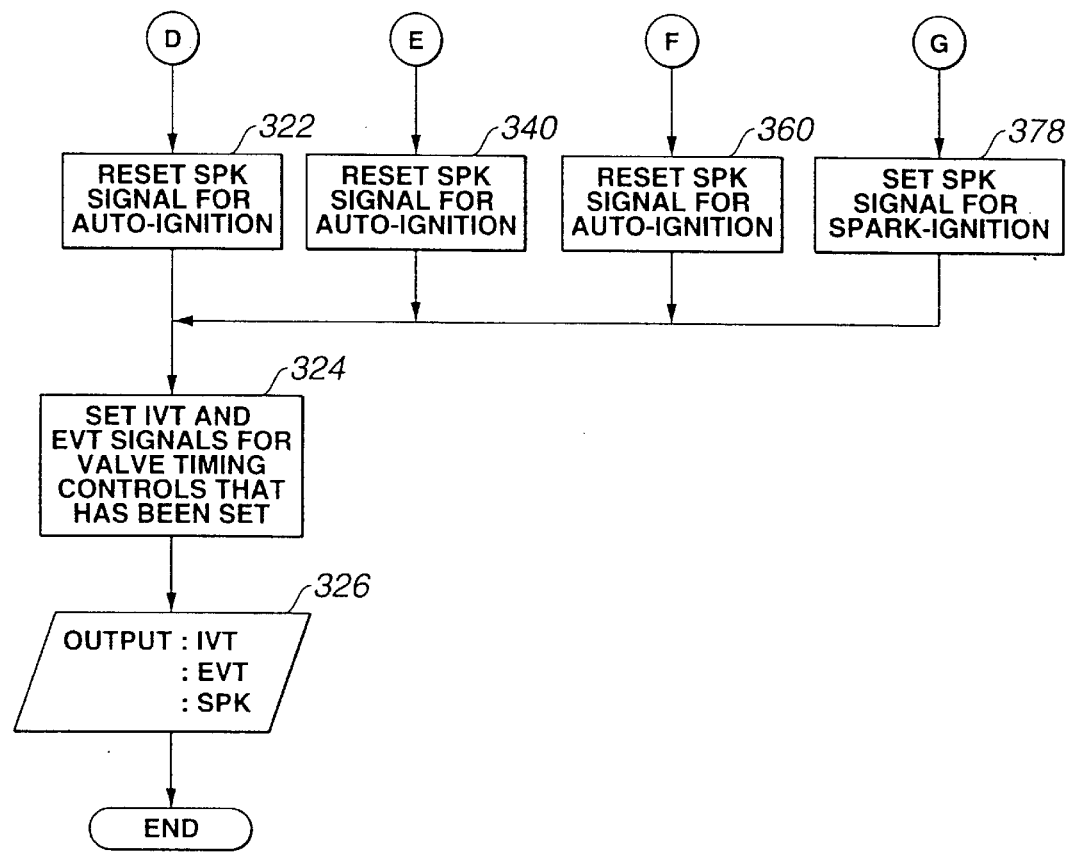

Referring now to FIGS. 18A, 18B, and 18C, a flowchart illustrating control logic in a system or method for operating an internal combustion engine is shown. One of ordinary skill in the art will recognize that the control logic may be implemented in software, hardware or a combination of software and hardware. The sequence of operations illustrated is not necessarily required, and is provided for ease of illustration only. Likewise, various steps may be performed in parallel or by dedicated electric or electronic circuits.

Block 300 represents input of signals VAPO, POS and REF. Block 302 represents calculation of engine speed based on POS and REF. Block 304 represents calculation of engine load based on VAPO and the engine speed. Block 306 represents calculation of total fuel quantity based on engine load. Block 308 represents selection of one of four combustion modes in response to engine load or engine speed.

During selection of gasoline reform auto-ignition combustion mode, interrogation at block 310 results in affirmative and processing proceeds to block 312. Block 312 represents setting of valve timing control to retain exhaust gas. Block 314 represents providing of start time of first fuel injection during exhaust gas retaining phase and start time of second fuel injection during compression phase. Block 316 represents determination of a portion and the remainder of total fuel quantity for first and second fuel injections, respectively. Block 318 represents determination of pulse widths of first and second fuel injection control signals in response to the portion and remainder of total fuel quantity, respectively. Block 322 represents resetting of SPK control signal for auto-ignition. Block 324 represents setting of IVT and EVT signals for valve timing control that has been set. Block 326 represents output of signals IVT, EVT, PCV and SPK.

During selection of auto-ignition stratified charge combustion mode, interrogation at block 330 results in affirmative and processing goes to block 332. Block 332 represents setting of valve timing control to retain exhaust gas. Block 334 represents providing of start time of fuel injection during compression phase. Block 336 represents determination of the pulse width of fuel injection control signal in response to total fuel quantity. Block 340 represents resetting of SPK control signal for auto-ignition. Processing next goes to blocks 324 and 326.

During selection of auto-ignition homogeneous charge combustion mode, interrogation at block 350 results in affirmative and processing goes to block 352. Block 352 represents setting of valve timing control to retain exhaust gas. Block 354 represents providing of start time of fuel injection during intake phase. Block 356 represents determination of pulse width of fuel injection control signal in response to total fuel quantity. Block 360 represents resetting of SPK control signal for auto-ignition. Processing next goes to blocks 324 and 326.

During selection of spark-ignition homogeneous combustion mode, the interrogation at block 350 results in negative and processing goes to block 370. Block 370 represents setting of valve timing control without exhaust gas retaining. Block 372 represents providing of start time of fuel injection during intake phase. Block 374 represents determination of pulse width of fuel injection control signal in response to total fuel quantity. Block 378 represents setting of SPK control signal for spark-ignition. Processing new goes to blocks 324 and 326.

While the present invention has been particularly described, in conjunction with preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Application No. 2000-015718, filed Jan. 25, 2000, the disclosure of which is hereby incorporated by reference in its entirety.

What is claimed is:

1. A system for an auto-ignition of gasoline internal combustion engine comprising:

a cylinder;

a piston disposed within said cylinder for reciprocating motion to define a combustion chamber;

intake means for admitting fresh air into said cylinder;

a fuel injector directly communicating with said combustion chamber;

exhaust means for discharging exhaust gas resulting from combustion within said cylinder; and a control unit adjusting opening and closing timings of said intake means and opening and closing timings of said exhaust means such that said piston reciprocates within said cylinder to perform an exhaust phase, an exhaust gas retaining phase, an intake phase, a compression phase, and an expansion phase, wherein said intake means and exhaust means being closed to retain exhaust gas within said cylinder during said exhaust gas retaining phase, said control unit providing a first start time of a first fuel injection by said fuel injector during said exhaust gas retaining phase and a second start time of a second fuel injection by said fuel injector during said compression phase, said control unit determining a portion of total fuel quantity and the remainder of said total fuel quantity, said control unit determining a first fuel injection control signal indicative of said portion of said total fuel quantity and applying said first fuel injection control signal to said fuel injector at said first start time to control fuel quantity injected for said first fuel injection, said control unit determining a second fuel injection control signal indicative of the remainder of said total fuel quantity and applying said second fuel injection control signal at said second start time to control fuel quantity injected for said second fuel injection, said remainder of said total fuel quantity being proportional to the engine load of the internal combustion engine.

2. The system as claimed in claim 1, wherein said portion of said determined total fuel quantity is substantially invariable with variation of the engine load of the internal combustion engine.

3. The system as claimed in claim 1, wherein said portion of said total fuel quantity is inversely proportional to the engine load of said internal combustion engine.

4. The system as claimed in claim 1, wherein said control unit provides said first start time of said first fuel injection during movement of said piston from the initiation of said exhaust gas retaining phase to the top dead center position during said exhaust gas retaining phase.

5. The system as claimed in claim 1, wherein said control unit advances said second start time of said second fuel injection as the engine load of said internal combustion engine increases.

6. The system as claimed in claim 1, wherein said control unit increases fuel quantity for said first fuel injection as the engine speed of said internal combustion engine increases.

7. The system as claimed in claim 1, wherein said control unit advances said start first time of said first fuel injection as the engine speed of the internal combustion engine increases.

8. The system as claimed in claim 1, wherein said control unit advances said second start time of said second fuel injection as the engine speed of said internal combustion engine increases.

9. A system for an auto-ignition of gasoline internal combustion engine comprising:

a cylinder;

a piston disposed within said cylinder for reciprocating motion to define a combustion chamber;

intake means for admitting fresh air into said cylinder;

a fuel injector directly communicating with said combustion chamber;

exhaust means for discharging exhaust gas resulting from combustion within said cylinder; and a control unit selecting one of a gasoline reform auto-ignition combustion mode and an auto-ignition combustion mode in response to magnitude of an operating parameter indicative of one of the engine load and the engine speed of the internal combustion engine, said control unit being operative during selection of said gasoline reform auto-ignition combustion mode to adjust opening and closing timings of said intake means and opening and closing timings of said exhaust means such that said piston reciprocates within said cylinder to perform an exhaust phase, an exhaust gas retaining phase, an intake phase, a compression phase, and an expansion phase, said control unit being operative during selection of said gasoline reform auto-ignition combustion mode to provide a first start time of a first fuel injection by said fuel injector during said exhaust gas retaining phase and a second start time of a second fuel injection by said fuel injector during said compression phase, said control unit determining total fuel quantity to be injected in response to engine load of the internal combustion engine, said control unit being operative during selection of said gasoline reform auto-ignition combustion mode to determine a portion of and the remainder of said determined total fuel quantity, said control unit being operative during selection of said gasoline reform auto-ignition combustion mode to determine a first fuel injection control signal indicative of said portion of said determined total fuel quantity and applying said first fuel injection control signal to said fuel injector at said first start time to control fuel quantity injected for said first fuel injection, said control unit being operative during selection of said gasoline reform auto-ignition combustion mode to determine a second fuel injection control signal indicative of the remainder of said determined total fuel quantity and applying said second fuel injection control signal at said second start time to control fuel quantity injected for said second fuel injection.

10. The system as claimed in claim 9, wherein said operating parameter is indicative of the engine load and wherein said control unit calculates said operating parameter indicative of the engine load in response to an accelerator pedal position and the engine speed.

11. The system as claimed in claim 9, wherein said operating parameter is indicative of the engine load of the internal combustion engine, and wherein said control unit selects said gasoline reform auto-ignition combustion mode when the engine load is less than a predetermined value.

12. The system as claimed in claim 11,
wherein said control unit selects said auto-ignition combustion mode when the engine load exceeds said predetermined value,
wherein said control unit is operative during selection of said auto-ignition stratified charge combustion mode to adjust opening and closing timings of said intake means and opening and closing timings of said exhaust means such that said piston reciprocates within said cylinder to perform an exhaust phase, an exhaust gas retaining phase, an intake phase, a compression phase, and an expansion phase,
wherein said control unit is operative during selection of said auto-ignition combustion mode to provide a third start time of a third fuel injection by said fuel injector during said intake phase and said compression phase, and
wherein said control unit is operative during selection of said auto-ignition combustion mode to determine a third fuel injection control signal indicative of said determined total fuel quantity and applying said third fuel injection control signal at said third start time to control fuel quantity injected for said third fuel injection.

13. The system as claimed in claim 9, wherein said control unit is operative during selection of said gasoline reform auto-ignition combustion mode to hold said first start time and said second start time invariable against variation in the engine load.

14. The system as claimed in claim 9, wherein said control unit is operative during selection of said gasoline reform auto-ignition combustion mode to hold said first start time invariable against variation in the engine load and adjust said second start time in response to the engine load such that said second start time advances as the engine load increases.

15. The system as claimed in claim 9, wherein said operating parameter is indicative of the engine speed of the internal combustion engine, and wherein said control unit selects said auto-ignition combustion mode when the engine speed is greater than a predetermined value.

16. The system as claimed in claim 15,
wherein said control unit selects said auto-ignition combustion mode when the engine speed drops below said predetermined value,
wherein said control unit is operative during selection of said auto-ignition combustion mode to adjust opening and closing timings of said intake means and opening and closing timings of said exhaust means such that said piston reciprocates within said cylinder to perform an exhaust phase, an exhaust gas retaining phase, an intake phase, a compression phase, and an expansion phase,
wherein said control unit is operative during selection of said auto-ignition combustion mode to provide a third start time of a third fuel injection by said fuel injector during said intake phase and said compression phase, and
wherein said control unit is operative during selection of said auto-ignition combustion mode to determine a third fuel injection control signal indicative of said determined total fuel quantity and applying said third fuel injection control signal at said third start time to control fuel quantity injected for said third fuel injection.

17. The system as claimed in claim 15, wherein said control unit is operative during selection of said gasoline reform auto-ignition combustion mode to adjust said first start time in response to the engine speed such that said first start time advances as the engine speed increases and to hold said second start time invariable against variation in the engine speed.

18. The system as claimed in claim 15, wherein said control unit is operative during selection of said gasoline reform auto-ignition combustion mode to hold said first start time invariable against variation in the engine speed and to adjust said second start time in response to the engine speed such that said second start time advances as the engine speed increases.

19. A computer readable storage device having stored therein data representing instructions executable by a computer to implement an auto-ignition of gasoline internal combustion engine, the engine having a piston disposed in a cylinder for reciprocating motion to define a combustion chamber, intake means for admitting fresh air into the cylinder, a fuel injector directly communicating with the combustion chamber, and exhaust means for discharging exhaust gas resulting from combustion within the cylinder, wherein opening and closing timings of the intake means and opening and closing timings of the exhaust means are adjustable, the computer readable storage device comprising:

instructions for adjusting opening and closing timings of the intake means and opening and closing timings of the exhaust means such that the piston reciprocates within the cylinder to perform an exhaust phase, an exhaust gas retaining phase, an intake phase, a compression phase, and an expansion phase;

instructions for providing a first start time of a first fuel injection by the fuel injector during said exhaust gas retaining phase and a second start time of a second fuel injection by the fuel injector during said compression phase;

instructions for determining a portion of total fuel quantity and the remainder of said total fuel quantity;

instructions for determining a first fuel injection control signal indicative of said portion of said total fuel quantity and applying said first fuel injection control signal to the fuel injector at said first start time to control fuel quantity injected for said first fuel injection; and instructions for determining a second fuel injection control signal indicative of the remainder of said total fuel quantity and applying said second fuel injection control signal to the fuel injector at said second start time to control fuel quantity injected for said second fuel injection.

20. A computer readable storage device having stored therein data representing instructions executable by a computer to implement an auto-ignition of gasoline internal combustion engine, the engine having a piston disposed in a cylinder for reciprocating motion to define a combustion chamber, intake means for admitting fresh air into the cylinder, a fuel injector directly communicating with the combustion chamber, and exhaust means for discharging exhaust gas resulting from combustion within the cylinder, wherein opening and closing timings of the intake means and opening and closing timings of the exhaust means are adjustable, the computer readable storage device comprising:

instructions for selecting one of a gasoline reform auto-ignition combustion mode and an auto-ignition combustion mode in response to magnitude of an operating parameter indicative of one of the engine load and the engine speed of the internal combustion engine;

instructions for adjusting, during selection of said gasoline reform auto-ignition combustion mode, opening and closing timings of the intake means and opening and closing timings of the exhaust means such that the piston reciprocates within the cylinder to perform an exhaust phase, an exhaust gas retaining phase, an intake phase, a compression phase, and an expansion phase;

instructions for providing, during selection of said gasoline reform auto-ignition combustion mode, a first start time of a first fuel injection by the fuel injector during said exhaust gas retaining phase and a second start time of a second fuel injection by the fuel injector during said compression phase;

instructions for determining total fuel quantity to be injected in response to engine load of the internal combustion engine;

instructions for determining, during selection of said gasoline reform auto-ignition combustion mode, a portion of and the remainder of said determined total fuel quantity;

instructions for determining, during selection of said gasoline reform auto-ignition combustion mode, a first fuel injection control signal indicative of said portion of said determined total fuel quantity and applying said first fuel injection control signal to the fuel injector at said first start time to control fuel quantity injected for said first fuel injection; and instructions for determining, during selection of said gasoline reform auto-ignition combustion mode, a second fuel injection control signal indicative of the remainder of said determined total fuel quantity and applying said second fuel injection control signal to the fuel injector at said second start time to control fuel quantity injected for said second fuel injection.

21. A method for an auto-ignition of gasoline internal combustion engine, the engine having a piston disposed in a cylinder for reciprocating motion to define a combustion chamber, intake means for admitting fresh air into the cylinder, a fuel injector directly communicating with the combustion chamber, and exhaust means for discharging exhaust gas resulting from combustion within the cylinder, wherein opening and closing timings of the intake means and opening and closing timings of the exhaust means are adjustable, the method comprising:

adjusting opening and closing timings of the intake means and opening and closing timings of the exhaust means such that the piston reciprocates within the cylinder to perform an exhaust phase, an exhaust gas retaining phase, an intake phase, a compression phase, and an expansion phase;

providing a first start time of a first fuel injection by the fuel injector during said exhaust gas retaining phase and a second start time of a second fuel injection by the fuel injector during said compression phase;

determining a portion of total fuel quantity and the remainder of said total fuel quantity;

determining a first fuel injection control signal indicative of said portion of said total fuel quantity;

determining a second fuel injection control signal indicative of the remainder of said total fuel quantity;

applying said first fuel injection control signal to the fuel injector at said first start time to control fuel quantity injected for said first fuel injection; and applying said second fuel injection control signal at said second start time to control fuel quantity injected for said second fuel injection.

22. A method for an auto-ignition of gasoline internal combustion engine, the engine having a piston disposed in a cylinder for reciprocating motion to define a combustion chamber, intake means for admitting fresh air into the cylinder, a fuel injector directly communicating with the combustion chamber, and exhaust means for discharging exhaust gas resulting from combustion within the cylinder, wherein opening and closing timings of the intake means and opening and closing timings of the exhaust means are adjustable, the method comprising:

selecting one of a gasoline reform auto-ignition combustion mode and an auto-ignition combustion mode in response to magnitude of an operating parameter indicative of one of the engine load and the engine speed of the internal combustion engine;

adjusting, during selection of said gasoline reform auto-ignition combustion mode, opening and closing timings of the intake means and opening and closing timings of the exhaust means such that the piston reciprocates within the cylinder to perform an exhaust phase, an exhaust gas retaining phase, an intake phase, a compression phase, and an expansion phase;

providing, during selection of said gasoline reform auto-ignition combustion mode, a first start time of a first fuel injection by the fuel injector during said exhaust gas retaining phase and a second start time of a second fuel injection by the fuel injector during said compression phase;

determining total fuel quantity to be injected in response to the engine load of the internal combustion engine;

determining, during selection of said gasoline reform auto-ignition combustion mode, a portion of and the remainder of said determined total fuel quantity;

determining, during selection of said gasoline reform auto-ignition combustion mode, a first fuel injection control signal indicative of said portion of said determined total fuel quantity;

determining, during selection of said gasoline reform auto-ignition combustion mode, a second fuel injection control signal indicative of the remainder of said determined total fuel quantity;

applying said first fuel injection control signal to the fuel injector at said first start time to control fuel quantity injected for said first fuel injection; and applying said second fuel injection control signal to the fuel injector at said second start time to control fuel quantity injected for said second fuel injection.

\* \* \* \* \*